(12) United States Patent
Mahmood et al.

(10) Patent No.: US 12,431,926 B2
(45) Date of Patent: Sep. 30, 2025

(54) CANCELLATION OF PASSIVE INTERMODULATION FROM MULTIPLE SOURCES

(71) Applicant: MAXLINEAR, INC., Carlsbad, CA (US)

(72) Inventors: Zohaib Mahmood, Westwood, MA (US); Subramanian Anantharaman Chandrasekarapuram, Bangalore (IN); Srivathsa Acharya, Bangalore (IN); Gopala Krishna Murthy Vemula, Bangalore (IN); Devika Sunilkumar, Bangalore (IN)

(73) Assignee: MaxLinear, Inc., Carlsbad, CA (US)

( * ) Notice: Subject to any disclaimer, the term of this patent is extended or adjusted under 35 U.S.C. 154(b) by 343 days.

(21) Appl. No.: 18/295,263

(22) Filed: Apr. 3, 2023

(65) Prior Publication Data

US 2023/0318648 A1    Oct. 5, 2023

Related U.S. Application Data

(60) Provisional application No. 63/362,407, filed on Apr. 3, 2022.

(51) Int. Cl.
*H04B 1/525* (2015.01)
*H04B 1/04* (2006.01)
(Continued)

(52) U.S. Cl.
CPC ........... *H04B 1/123* (2013.01); *H04B 1/0475* (2013.01); *H04B 1/525* (2013.01); *H04L 25/03* (2013.01)

(58) Field of Classification Search
None
See application file for complete search history.

(56) References Cited

U.S. PATENT DOCUMENTS 8,982,995 B1 * 3/2015 Van Cai ............... H04B 1/0475
375/297
8,983,454 B2 * 3/2015 Bevan .................... H04B 1/123
455/296

(Continued)

OTHER PUBLICATIONS

Electronicnotes "Passive Intermodulation, PIM Distortion" website <https://www.electronics-notes.com/articles/radio/passive-intermodulation-pim/what-is-pim-basics-primer.php> retrieved Apr. 3, 2023.

(Continued)

*Primary Examiner* — Tuan A Tran
(74) *Attorney, Agent, or Firm* — Buchalter; Jason W. Croft

(57) ABSTRACT

A system includes a receiver (RX) configured to receive an RX output signal in an RX band, where the RX output signal has a first passive intermodulation (PIM) source in the RX band and a second PIM source in the RX band; and a processing device configured to: receive the RX output signal from the receiver on an RX path, receive a crest factor reduction (CFR) output signal from a CFR on a transmit (TX) path, identify the first PIM source and the second PIM source based on the RX output signal and the CFR output signal, calibrate the CFR output signal based on the first and second PIM sources in the RX output signal to generate a non-linear actuation (NA) input signal, and generate an intermodulation distortion signal by using an NA function on the NA input signal.

25 Claims, 20 Drawing Sheets

(51) Int. Cl.
  *H04B 1/10* (2006.01)
  *H04B 1/12* (2006.01)
  *H04B 15/00* (2006.01)
  *H04L 25/03* (2006.01)

(56) References Cited

U.S. PATENT DOCUMENTS

| | | | | |
|---|---|---|---|---|
| 9,331,882 | B2* | 5/2016 | Fehri | H04L 27/2623 |
| 9,414,245 | B2* | 8/2016 | Bevan | H04W 24/06 |
| 9,420,479 | B2* | 8/2016 | Bevan | H04B 1/123 |
| 9,461,697 | B2* | 10/2016 | Yu | H04B 15/00 |
| 9,628,120 | B2* | 4/2017 | Yu | H03F 1/02 |
| 9,876,663 | B2* | 1/2018 | Nordström | H04L 27/2623 |
| 9,882,591 | B2* | 1/2018 | Bevan | H04B 7/0413 |
| 10,243,612 | B2* | 3/2019 | Mukaida | H04W 88/12 |
| 10,727,896 | B2* | 7/2020 | Lv | H04B 1/0475 |
| 11,121,734 | B2* | 9/2021 | Jiang | H04B 1/04 |
| 11,575,400 | B2* | 2/2023 | Mullins | H04B 1/1081 |
| 11,664,964 | B2* | 5/2023 | Zhao | H04B 1/10 370/278 |
| 11,849,476 | B2* | 12/2023 | Österling | H04W 72/542 |
| 11,942,980 | B2* | 3/2024 | Gopalan | H04B 1/109 |
| 12,047,127 | B2* | 7/2024 | Abdelmonem | H04L 5/14 |
| 12,143,135 | B2* | 11/2024 | Kularatna | H04B 1/123 |
| 2015/0111515 | A1* | 4/2015 | Su | H04B 1/525 455/295 |
| 2019/0229760 | A1* | 7/2019 | Jiang | H04B 1/04 |
| 2019/0253098 | A1 | 8/2019 | Lv et al. | |
| 2020/0021323 | A1 | 1/2020 | Cyzs et al. | |
| 2020/0177229 | A1 | 6/2020 | Huang et al. | |
| 2020/0395963 | A1 | 12/2020 | Megretski et al. | |
| 2022/0038125 | A1 | 2/2022 | Mullins | |
| 2023/0318656 | A1 | 10/2023 | Mahmood et al. | |
| 2024/0322862 | A1* | 9/2024 | Abdelmonem | H01Q 3/36 |
| 2025/0088208 | A1* | 3/2025 | Zhu | H04B 1/1027 |

OTHER PUBLICATIONS

International Search Report and Written Opinion for International Application No. PCT/US2023/017352, mailed Jul. 11, 2023, 8 Pages.

International Search Report and Written Opinion for International Application No. PCT/US2023/017353, mailed Jul. 10, 2023, 9 Pages.

Restriction Requirement for U.S. Appl. No. 18/295,264, dated May 21, 2025, 6 pages.

* cited by examiner

1300 compute, on a passive intermodulation cancellation (PIMC) control path, one or more diagnostic receive (dRx) calibration parameters to match a dRx output signal to a receiver (Rx) output signal, wherein the dRx output signal has an external source ⎯1310 compute, on the PIMC control path, one or more dRx PIMC coefficients for a dRx nonlinear actuation (NA) function ⎯1320 send, from the PIMC control path to a PIMC data path, the one or more dRx calibration parameters and the one or more dRx PIMC coefficients to generate a dRx intermodulation distortion signal based on the dRx NA function ⎯1330

FIG. 13

CANCELLATION OF PASSIVE INTERMODULATION FROM MULTIPLE SOURCES

RELATED APPLICATION

This application claims the benefit of U.S. Provisional Application No. 63/362,407, filed Apr. 3, 2022, the disclosure of which is incorporated herein by reference in its entirety.

FIELD

The embodiments discussed in the present disclosure are related to receiver sensitivity enhancement by passive intermodulation cancellation (PIMC).

BACKGROUND

Unless otherwise indicated herein, the materials described herein are not prior art to the claims in the present application and are not admitted to be prior art by inclusion in this section.

Passive intermodulation typically refers to the intermodulation products generated when two or more signals transit through a passive device with nonlinear properties. Passive intermodulation may be caused by communication devices or by environmental factors. Passive intermodulation may interfere with a desired received signal.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In some embodiments, a base station may be configured for enhanced receiver sensitivity. The base station may comprise a receiver (Rx) configured to receive an Rx output signal in an Rx band; and a processing device. The processing device may be configured to: receive the Rx output signal from the receiver on an Rx path; receive a crest factor reduction (CFR) output signal from a CFR on a transmit (Tx) path; calibrate the CFR output signal based on the Rx output signal to generate a non-linear actuation (NA) input signal; and generate an intermodulation distortion signal by using an NA function on the NA input signal.

In some embodiments, a computer-readable storage medium may include computer executable instructions that, when executed by one or more processors, may cause a base station to compute, on a passive intermodulation cancellation (PIMC) control path, one or more calibration parameters to match a crest factor reduction (CFR) output signal to a receiver (Rx) output signal. The computer executable instructions may cause a base station to compute, on the PIMC control path, one or more PIMC coefficients for a nonlinear actuation (NA) function. The computer executable instructions may cause a base station to send, from the PIMC control path to a PIMC data path, the one or more calibration parameters and the one or more PIMC coefficients to generate an intermodulation distortion signal based on the NA function.

In some embodiments, a base station may be configured for enhanced receiver sensitivity may comprise a receiver (Rx) configured to receive an Rx output signal in an Rx band, wherein the Rx output signal has a first passive intermodulation (PIM) source in the Rx band and a second PIM source in the Rx band, and a processing device. The processing device may be configured to: receive the Rx output signal from the receiver on an Rx path; receive a crest factor reduction (CFR) output signal from a CFR on a transmit (Tx) path; identify the first PIM source and the second PIM source based on the Rx output signal and the CFR output signal; calibrate the CFR output signal based on the first and second PIM sources in the Rx output signal to generate a non-linear actuation (NA) input signal; and generate an intermodulation distortion signal by using an NA function on the NA input signal.

In some embodiments, a base station may be configured for enhanced receiver sensitivity may comprise a receiver (Rx) path configured to receive an Rx output signal, a diagnostic receiver (dRx) path configured to receive a dRx output signal, wherein the dRx output signal has an external source, and a processing device. The processing device may be configured to: receive the Rx output signal from the receiver path; receive the dRx output signal from the dRx path; calibrate the dRx output signal based on the Rx output signal to generate a dRx non-linear actuation (NA) input signal; and generate a dRx intermodulation distortion signal by using a dRx NA function on the dRx NA input signal.

In some embodiments, a computer-readable storage medium may include computer executable instructions that, when executed by one or more processors, may cause a base station to: compute, on a passive intermodulation cancellation (PIMC) control path, one or more diagnostic receiver (dRx) calibration parameters to match a dRx output signal to a receiver (Rx) output signal, wherein the dRx output signal has an external source; compute, on the PIMC control path, one or more dRx PIMC coefficients for a dRx nonlinear actuation (NA) function; and send, from the PIMC control path to a PIMC data path, the one or more dRx calibration parameters and the one or more dRx PIMC coefficients to generate a dRx intermodulation distortion signal based on the dRx NA function.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 13 illustrates a process flow for a computer readable medium used for enhanced receiver sensitivity.

DESCRIPTION OF EMBODIMENTS

Figure 1A:
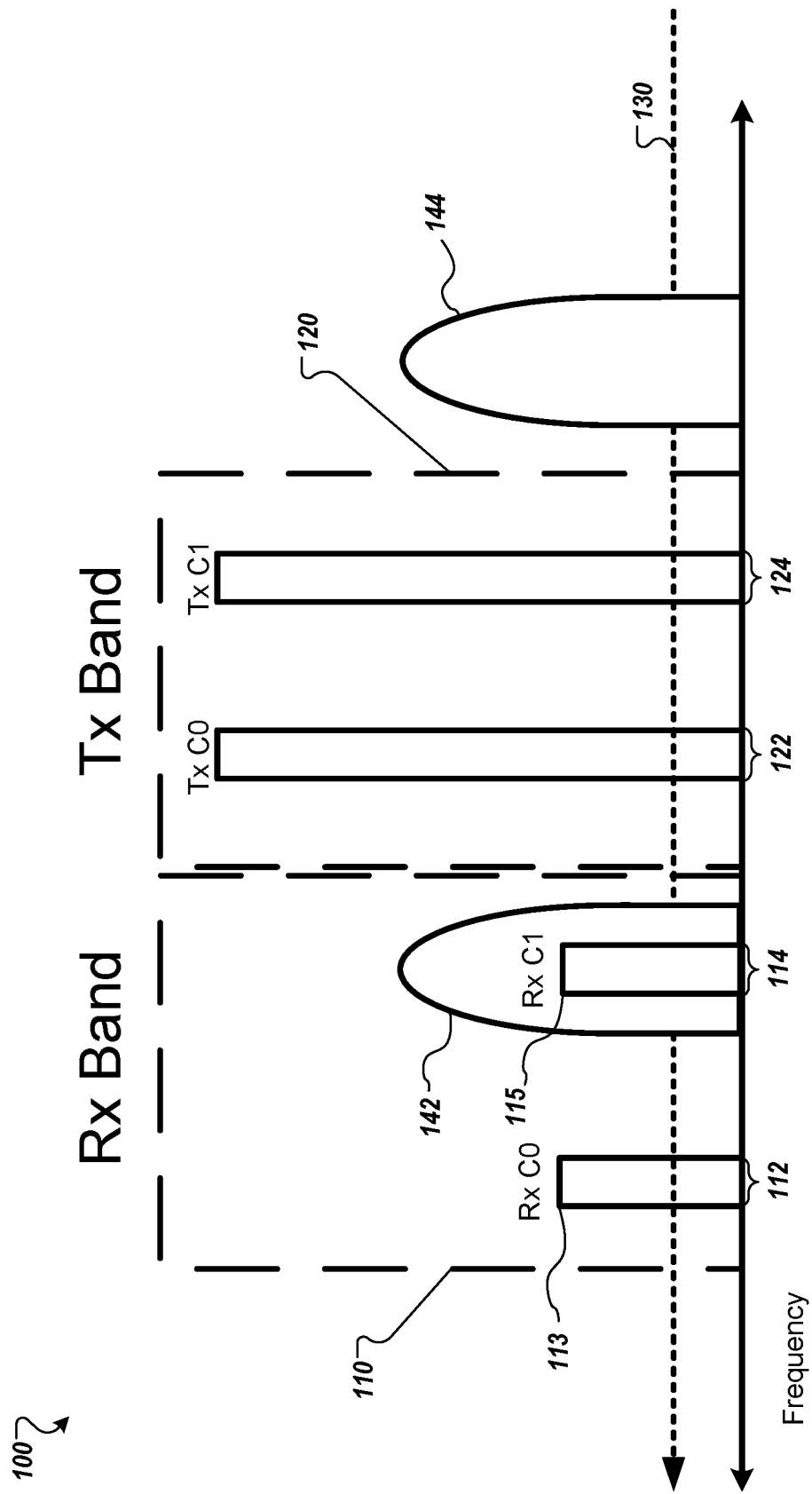
FIG. 1A illustrates an example radio frequency spectrum including passive intermodulation.

Communication systems may be subject to passive intermodulation that may interfere with communication signals. Passive intermodulation (PIM) may occur, even when no active components are present, as a consequence of passive components that have non-linear responses to signals. PIM may be generated by electronic components (e.g., coaxial connectors, joints, switches, feeder lines, loose connections, dirty connections, isolators, or the like), oxidized metals (e.g., rusty nails), ferromagnetic metals (e.g., iron), or interfaces between dissimilar metals. In some cases, PIM may be generated by components that often exhibit linear properties. PIM may interfere with a desired signal when the amplitude of the PIM exceeds a threshold.

Passive intermodulation and its effect on desired signals may not interfere with communication devices when the amplitude is sufficiently low. However, when modulation is applied to signals having passive intermodulation, the modulated signal may occupy a greater bandwidth. Furthermore, when the transmitter and receiver share the same antenna by using a duplexer, the passive intermodulation affecting the transmitter may be removed by using a filter and being reduced to a level that does not have excessive noise when received by a receiver. In contrast, the receiver may encounter passive intermodulation that may not be removed when the transmitting and receiving signal paths are combined in the antenna. Various communication systems may use the same antenna such as base stations, satellite systems, duplex communication systems, and the like.

At higher power levels passive components may exhibit non-linear behavior and generate PIM. When PIM falls on a receive band, the PIM may degrade the sensitivity of the receiver. PIM Cancellation (PIMC) may be achieved by reducing or mitigating PIM to enhance receiver sensitivity. PIMC may be applied to internal PIM for frequency division duplex (FDD) use cases in which both the PIM generating components and the PIM affected components are locally within the same communication device (e.g., radio unit).

PIM may be canceled in particular applications, such as macrocell and remote radio head (RRH) applications. PIMC may allow a device to include low-cost duplexer filters, which may otherwise generate excessive PIM and interfere with the received signal. Additionally, duplexers, cables, and connectors may degrade over time due to exposure to natural elements which may result in oxidation and an increase in the amount of PIM generated. Consequently, PIMC may reduce technician visits, radio down times, and generally lower radio maintenance costs.

Disclosed herein are systems, devices, and methods for cancelling PIM to enhance receiver sensitivity. In some embodiments, a base station may comprise a receiver (Rx) configured to receive an Rx output signal in an Rx band; and a processing device. The processing device may be configured to: receive the Rx output signal from the receiver on an Rx path, and receive a crest factor reduction (CFR) output signal from a CFR on a transmit (Tx) path. The processing device may be configured to calibrate the CFR output signal based on the Rx output signal to generate a non-linear actuation (NA) input signal, and generate an intermodulation distortion signal by using an NA function on the NA input signal.

Disclosed herein are systems, devices, and methods for cancelling PIM from a plurality of sources. In some embodiments, a base station may comprise an Rx configured to receive an Rx output signal in an Rx band, wherein the Rx output signal has a first PIM source in the Rx band and a second PIM source in the Rx band, and a processing device. The processing device may be configured to: receive the Rx output signal from the receiver on an Rx path; receive a CFR output signal from a CFR on a Tx path, and identify the first PIM source and the second PIM source based on the Rx output signal and the CFR output signal. In some embodiments, a processing device may be configured to calibrate the CFR output signal based on the first and second PIM sources in the Rx output signal to generate a non-linear actuation (NA) input signal, and generate an intermodulation distortion signal by using an NA function on the NA input signal.

Embodiments of the present disclosure will be explained with reference to the accompanying drawings.

In some embodiments, as illustrated in FIG. 1A, a radio frequency (RF) spectrum 100 may include a receiving (Rx) frequency band 110 and a transmitting (Tx) frequency band 120. The Rx frequency band 110 may include an Rx channel Rx C0 112 and an Rx channel Rx C1 114. The Tx frequency band may include a Tx channel Tx C0 122 and a Tx channel Tx C1 124. When the Rx sensitivity threshold 130 is less than the received signal amplitude 113, 115 of a received signal in an Rx channel 112, 114, the received signal may be sensed in the Rx channel 112, 114.

In some embodiments, however, the presence of intermodulation distortion (IMD) 142 may prevent a received signal in an Rx channel 114 from being sensed when the IMD has a greater amplitude 142 than the Rx sensitivity threshold 130 and the received signal amplitude 115. The intermodulation distortion 142, when greater than the Rx sensitivity threshold 130, may interfere with sensing the receiving signal in the Rx channel 114, as shown by the frequency and amplitude overlap between Rx channel Rx C1

114 and the intermodulation distortion 142. Other IMD may be present in unrelated frequency bands as shown by intermodulation distortion 144.

Figure 1B:
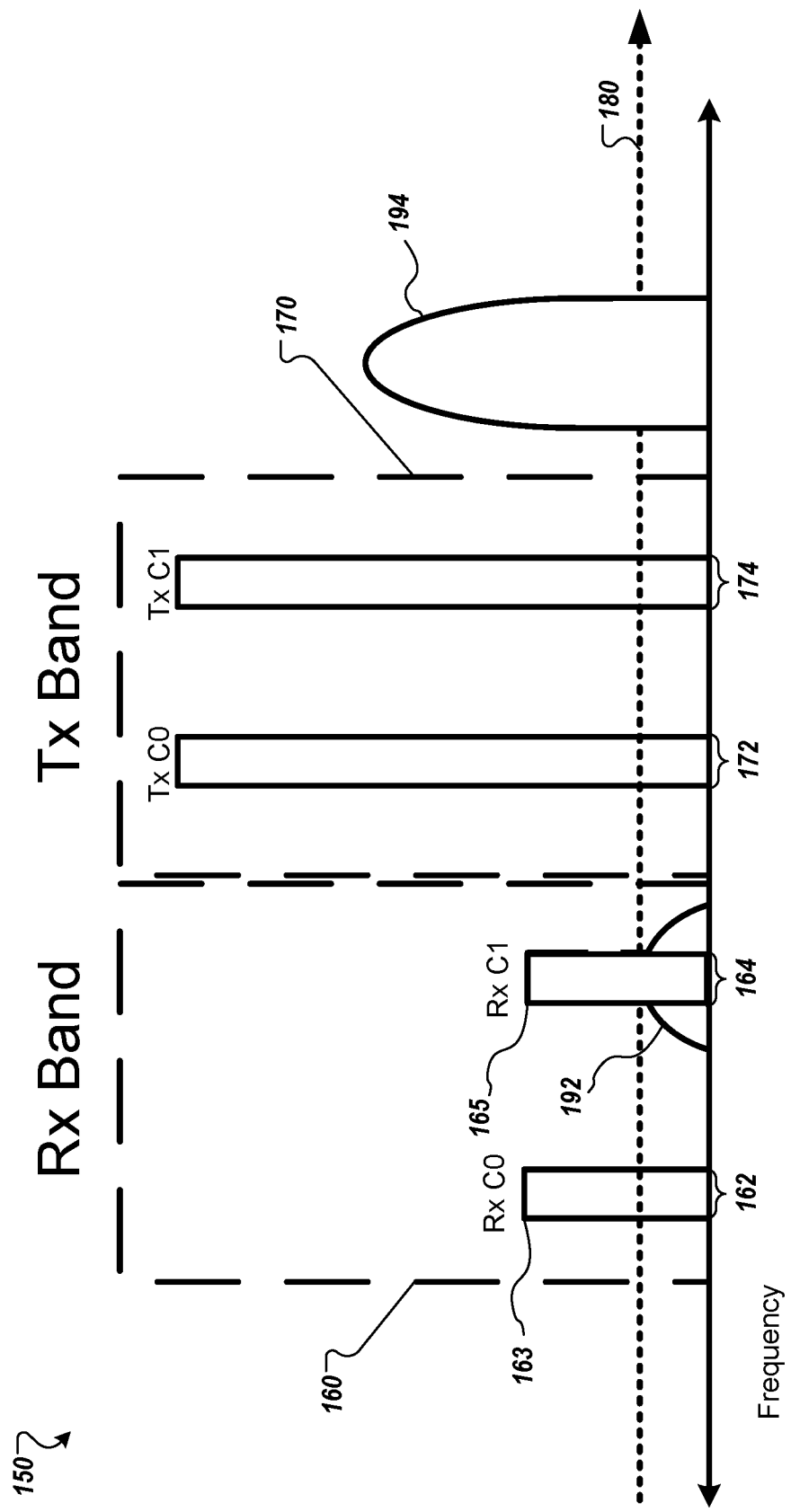
FIG. 1B illustrates an example radio frequency spectrum including passive intermodulation canceled by passive intermodulation cancellation.

In some embodiments, as illustrated in FIG. 1B, an RF spectrum 150 may include: an Rx frequency band 160 having Rx channels Rx C0 162 with amplitude 163 and Rx C1 164 with amplitude 165, and a Tx frequency band 170 having Tx channels Tx C0 172 and Tx C1 174. The Rx sensitivity threshold 180 may indicate when intermodulation distortion 192 may interfere with an Rx signal in an Rx channel 164. In this example, the intermodulation distortion 192 is less than the Rx sensitivity threshold 180 in contrast to the intermodulation distortion 142 and the Rx sensitivity threshold 130 in FIG. 1A. Therefore, reducing the intermodulation distortion may enhance receiver sensitivity.

Figure 2:
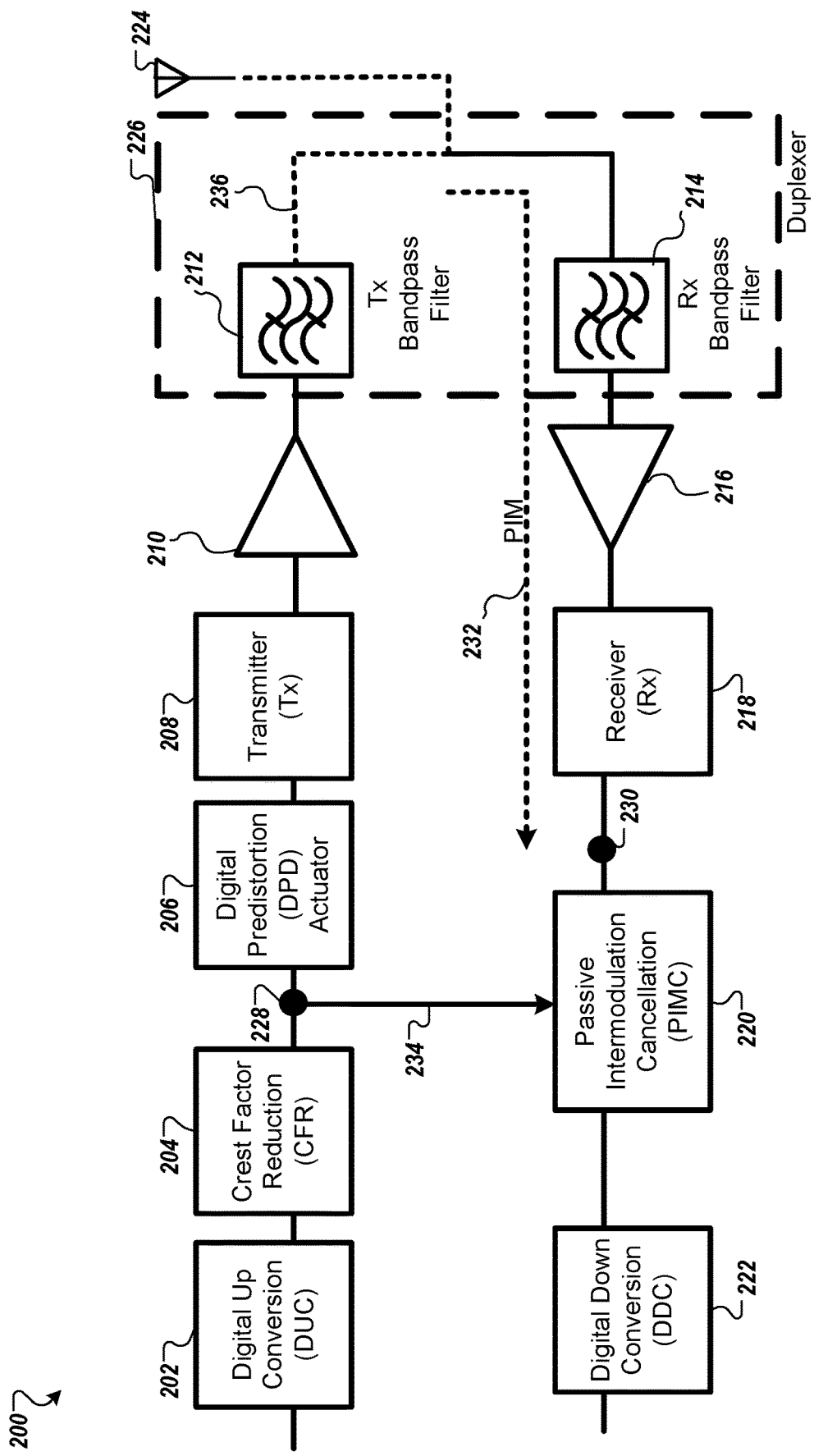
FIG. 2 illustrates an example communication system configured to cancel passive intermodulation.

In some embodiments, as illustrated in FIG. 2, a communication system 200 may comprise one or more of a digital up conversion (DUC) block 202, a crest factor reduction (CFR) block 204, a digital pre-distortion actuator (DPD) 206, a transmitter (Tx) 208, a power amplifier (PA) 210, a Tx bandpass filter 212, an Rx bandpass filter 214, a low noise amplifier 216, a receiver (Rx) 218, a passive intermodulation cancellation (PIMC) block 220, a digital down conversion (DDC) block 222, an antenna 224, a duplexer 226, or the like.

In some embodiments, a base station may be configured for enhanced receiver sensitivity. The base station may comprise a receiver (Rx) 218 configured to receive an Rx output signal 230 in an Rx band. The base station may comprise a processing device (e.g., at the PIMC 220) configured to receive the Rx output signal 230 from the receiver 218 on an Rx path (e.g., the signal path from the antenna 224 to the Rx bandpass filter 214, to the low noise amplifier 216, to the receiver 218). The processing device may be configured to receive a crest factor reduction (CFR) output signal 228 from a CFR 204 on a transmit (Tx) path (e.g., the signal path from the DUC 202 to the CFR 204). The processor may be configured to calibrate the CFR output signal 228 based on the Rx output signal 230 to generate a non-linear actuation (NA) input signal. The processor may be configured to generate an intermodulation distortion signal by using an NA function on the NA input signal.

In some embodiments, in the communication system 200, the CFR output 228 may be used to generate a cancellation signal to reduce internal PIM in the Rx output signal 230 and thereby enhance receiver sensitivity. In some embodiments, the communication system 200 may be configured to tap off a transmit signal to be used to generate a cancellation signal from a different output block on the transmit path (e.g., output from the DUC 202, the DPD 206, the Tx 208, the Tx bandpass filter 212, or the like). In some embodiments, the communication system 200 may be configured to tap off a receive signal from a different output block on the receiver path (e.g., output from the Rx bandpass filter 214, the low noise amplifier 216, the DDC 222, or the like). When the transmit signal is not tapped off at the CFR output 228 and the receiver signal is not tapped off at the Rx Out 230, the PIMC block may be reconfigured to cancel the PIM based on the particular signals received.

In some embodiments, tapping off at the CFR output 228 (by receiving the CFR output via the connection 234) may enhance the receiver sensitivity compared to other tap off locations on the transmit path. For example, tapping off a signal before DUC 202 may result in various types of distortion such as aliasing, aperture error, and quantization. Aliasing may occur when the sampling rate is too low, which may be the case before digital up-conversion because the component carriers may overlap. Moreover, tapping off after Tx 208 may result in under-sampling and/or may result in intermodulation products that are not at a proper frequency. Thus, tapping off at the CFR output 228 may provide intermodulation at the proper frequency for generating a passive intermodulation cancellation signal. The DPD 206 may be configured to match the output of the power amplifier 210 to the CFR output so that the PIMC generated based on the CFR output may match the signal producing the intermodulation distortion (e.g., a PIM source 232 arising from the signal path 236).

Figure 3:
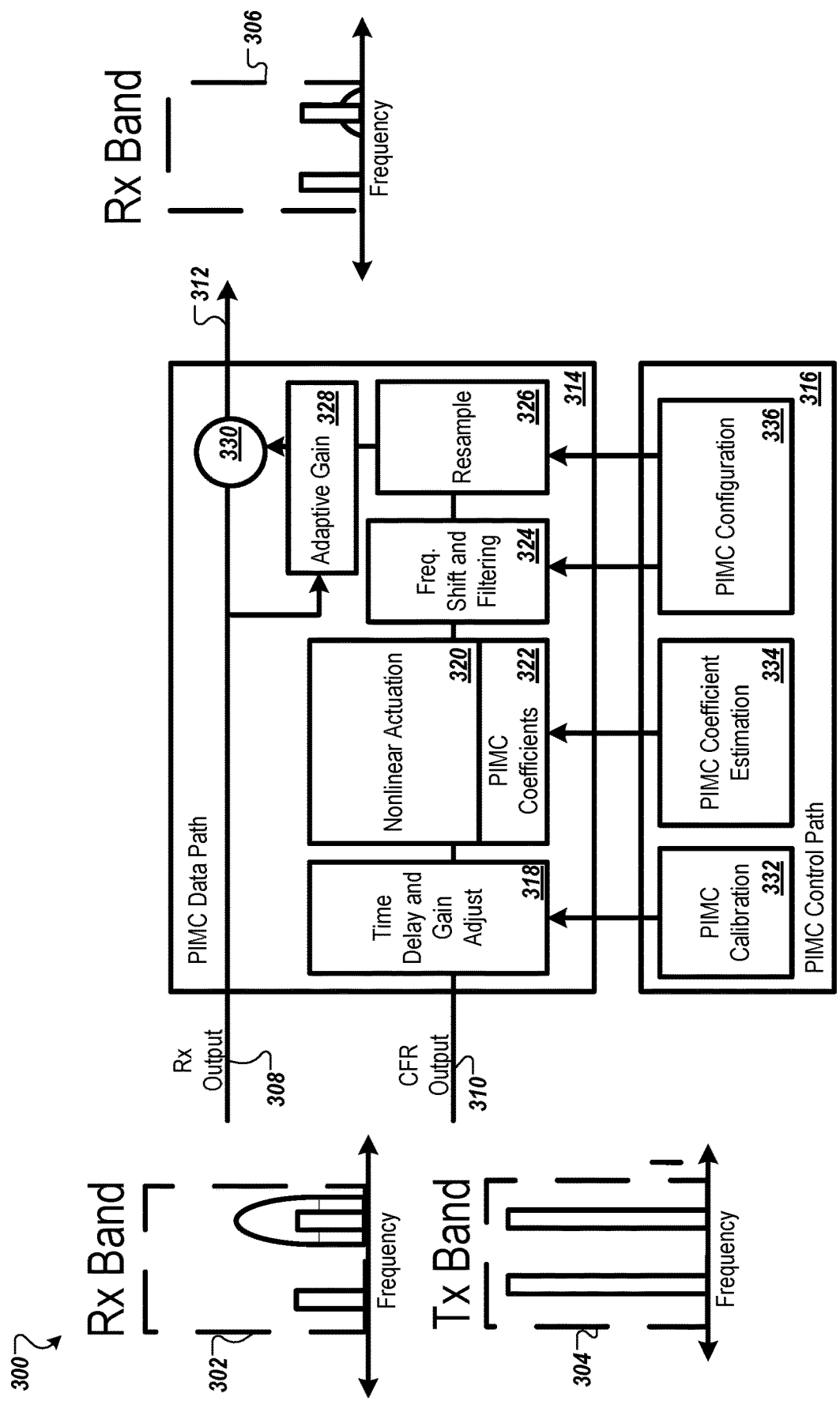
FIG. 3 illustrates an example block diagram showing the data path and control path for passive intermodulation cancellation.

In some embodiments, when the transmit signal is tapped off at the CFR output and the receiver signal is tapped off at Rx Out 230, the signal propagation, in the frequency domain, may be illustrated as shown in FIG. 3 in the PIMC system 300. The PIMC system 300 illustrates a PIMC data path 314 and a PIMC control path 316. The sub-blocks in the PIMC data path 314 process the data IQ samples in real-time as the samples become available. Hence, these sub-blocks may be implemented using high speed hardware logic. On the other hand, the sub-blocks in PIMC control path 316 provide configuration parameters and coefficients. These sub-blocks may be implemented using high speed hardware logic or software running on a host processor.

In some embodiments, a receiver signal (e.g., Rx output signal 308) in an Rx Band 302 may be received at the PIMC data path 314. The PIMC data path 314 may also be configured to receive a CFR output signal 310 in a Tx band 304. The PIMC data path 314 and PIMC control path 316 may be configured to generate a correct Rx signal 312 that may have reduced IMD compared to the Rx output signal 308 to facilitate enhanced receiver sensitivity, as shown by the Rx band 306.

In some embodiments, the CFR output signal 310 may be calibrated based on one or more time delay coefficients in a time delay and gain adjust operation 318. Alternatively, or in addition, the CFR output signal 310 may be calibrated based on one or more gain adjust coefficients. Alternatively, or in addition, the CFR output signal 310 may be calibrated based on one or more phase adjust coefficients. One or more of the time delay coefficients, the gain adjust coefficients, or the phase adjust coefficients may be computed as shown in operation 332 on the PIMC control path 316.

In some embodiments, the NA function may be computed, as shown in operation 320, using a non-linear function including one or more of: a look-up table (LUT), a polynomial, a wavelet function, a piecewise linear (PWL) function, or the like. The non-linear function may be computed using passive intermodulation cancellation (PIMC) coefficients, as shown in operation 322. The PIMC coefficients may be estimated, as shown in operation 334, by computing a least squares solution using one or more of: closed-form using an inverse matrix, or gradient descent using a fixed step-size parameter, or conjugate-gradient descent using a dynamic step-size parameter. The PIMC coefficients may be estimated based on one or more parameters including leak factor, number of batches, or batch-size. The fixed step-size parameter or the dynamic step-size parameter may be configured based on one or more of closed-loop stability, estimated noise suppression, or a time of convergence. The PIMC coefficients may be sent to the PIMC coefficient 322 operation to be used in the nonlinear actuation operation 320.

In some embodiments, a frequency shift of the intermodulation distortion signal (i.e., the signal output from the nonlinear actuation operation 320) may be computed at operation 336 and applied at operation 324 to match a frequency location of passive intermodulation in the Rx output signal 308. Based on this frequency shift of the intermodulation distortion signal, one or more filters may be configured to remove signals outside a frequency range for the PIMC signal. Alternatively, or in addition, a multi-band filter may be configured to select an Rx frequency range to remove interleaved uplink and downlink frequency bands.

In some embodiments, the intermodulation distortion signal may be re-sampled, as shown in operation 326 to match an IQ sample rate of the Rx output signal 308 based on a re-sample ratio, as computed at operation 336, between the Rx output signal 308 and the CFR output signal 310.

In some embodiments, the PIMC data path 314 may comprise an adaptive filter configured to adjust a gain and/or phase of the intermodulation distortion signal, as shown in operation 328. The gain and/or phase may be adjusted based on an automatic gain control (AGC) error, a low noise amplifier (LNA) error, a temperature-induced error, or the like.

In some embodiments, a PIMC subtractor 330 may be configured to generate a corrected Rx signal based on the intermodulation distortion signal (i.e., the output from the nonlinear actuator 320, which may be processed by the frequency shift and filtering operation 324, the resampling operation 326, and the adaptive gain operation 328) and the Rx output signal 308.

In some embodiments, the PIMC data path 314 and/or PIMC control path 316 may be configured to generate a PIMC bypass signal. The PIMC bypass signal may prevent passive intermodulation cancellation from occurring. The PIMC bypass signal may be generated when one or more of: an antenna is being calibrated, a power amplifier (PA) protection procedure is being performed, or PIM is not detected based on one or more of a frequency allocation or an estimated PIM correction level.

In some embodiments, the PIMC data path may comprise an on-board calibration unit or an on-board coefficient estimation engine. The on-board calibration unit may be configured to calibrate the CFR output signal 310 based on the Rx output signal 308 using adaptive calculation and adaptive adjustment. The on-board coefficient estimation engine may be configured to compute the NA function using one or more passive intermodulation cancellation (PIMC) coefficients that may be calculated and updated based on radio traffic data (e.g., that may be received in real time).

In some embodiments, the PIMC data path 314 may be implemented using high-speed processing that may be implemented using a field-programmable gate array (FPGA) or an application specific integrated circuit (ASIC). The PIMC control path 316 may be implemented using an FPGA or ASIC, or may be implemented as computer-readable instructions executed by a processor.

Figure 4:
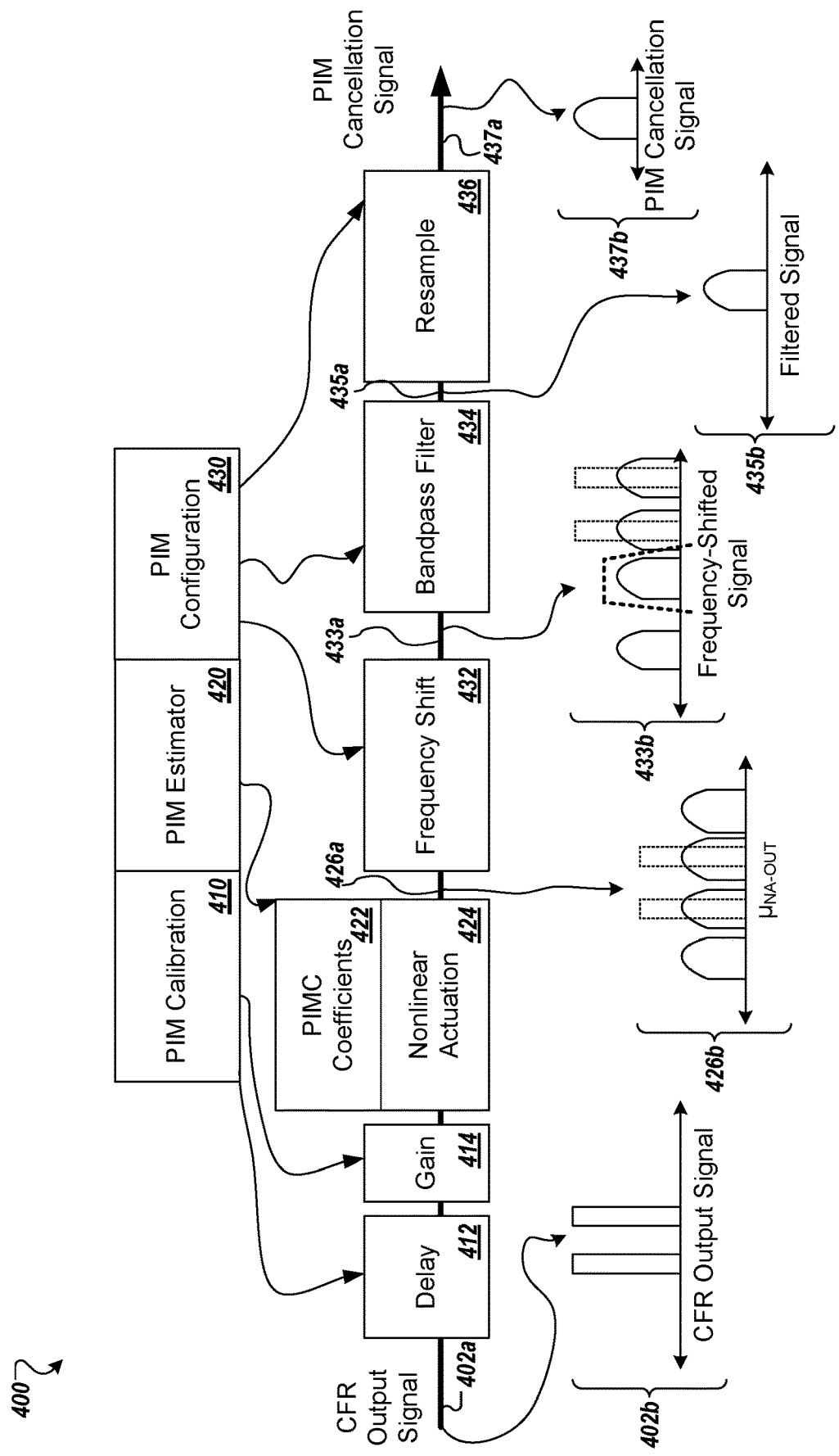
FIG. 4 illustrates an example signal propagation through blocks of a passive intermodulation cancellation system.

In some embodiments, as illustrated in FIG. 4, the PIMC system 400 may be configured to direct a signal through one or more of a delay block 412, a gain block 414, a non-linear actuation block 424 interfaced with a PIMC coefficient block 422, a frequency shift block 432, a bandpass filter block 434, and a resample block 436. The PIM calibration block 410 may be configured to send PIM calibration parameters to one or more of the delay block 412, the gain block 414, or a phase block (not shown). The PIM estimator block 420 may be configured to send PIMC coefficients to the PIMC coefficient block 422. The PIMC configuration block 430 may be configured to send PIM configuration parameters to one or more of the frequency shift block 432, the bandpass filter block 434, or the resample block 436.

In some embodiments, PIM cancellation flow may include: (i) CFR output through a time delay alignment, gain adjustment, and phase adjustment to generate a signal (i.e., $u_{NA-IN}$). The signal ($u_{NA-IN}$) may be input to the nonlinear actuation block 424, to generate the output, $u_{NA-OUT}$. The signal ($u_{NA-OUT}$) may be input to a frequency shift BLOCK 432 to generate the PIM cancellation signal to align the Rx output signal in the frequency domain. The frequency planning of the radio may be used to align the Rx output signal with the PIM cancellation signal.

In some embodiments, after frequency shifting, a bandpass filter block 434 may be used to filter out out-of-band frequency components to retain the desired cancellation signal. After filtering, a resample block 436 may be configured to match the cancellation signal and the received signal sampling rate. In some examples, the Rx output sampling rate may be different than the CFR output sampling rate. When the sampling rate matches, the PIM cancellation signal may be subtracted from the Rx output signal. After matching the sampling rate, the adaptive gain block (e.g., 328 in FIG. 3) may be configured to measure the PIM levels in the Rx output signal and adaptively adjust the gain for the cancellation signal to achieve maximum cancellation. After adaptively adjusting the gain for the cancellation signal, a subtraction operator (e.g., 330 in FIG. 3) may be configured to cancel the generated PIM cancellation signal from the Rx output signal.

In some embodiments, the CFR output signal 402a may be directed to a delay block 412. The delay block 412 may be configured to facilitate time alignment between the CFR output signal 402a and the Rx output signal. The delay may be computed using several methods including one or more of a round-trip delay, a cross correlation error, or a mean squared error between the CFR output signal 402a and the Rx output signal. In some examples, the delay alignment may be applied using one or more of integer delays (e.g., sample alignment) or fractional delays (e.g., sub-sample alignment). When multiple PIM sources are present (e.g., PIM at a diplexer junction and PIM at an antenna connector interface), the delay for each source may be estimated and applied.

In some embodiments, the CFR output signal 402a may be configured to be directed to a gain block 414. The gain block may be configured to multiply the incoming signal (e.g., the CFR output signal 402a as directed from the delay block 412) with a gain adjust coefficient to align the amplitude values between the CFR output signal 402a and the Rx output signal. The gain adjust coefficients may be computed based on one or more of: (i) a gain-adjustment match between the CFR output signal 402a and the NA function input signal, (ii) an automatic gain control (AGC) radio frequency (RF) attenuation state for the Rx output signal, or (iii) variation induced by temperature or component age. Matching the CFR output gain-adjustment to the non-linear actuation function input may minimize rounding and saturation effects due to a particular fixed-point hardware implementation. Variation induced by temperature or component age, may result in slow and continuous variation in PIM that may be adjusted by using a PIM cancellation signal having dynamic run-time gain adjustment and/or phase adjustment.

In some embodiments, the CFR output signal 402a may be configured to be directed to a phase block (not shown). The phase block may be configured to multiply the incoming signal (e.g., the CFR output signal 402a as directed from one or more of the delay block 412 or the gain block 414) with a phase adjust coefficient to align the phase values between the CFR output signal 402a and the Rx output signal. The phase adjust coefficients may be computed based on one or more of: (i) a phase-adjustment match between the CFR output signal and the NA function input signal, or (ii) variation induced by temperature or component age.

In some embodiments, a computer-readable storage medium may include computer executable instructions that, when executed by one or more processors, may cause a base station to compute, on a passive intermodulation cancellation (PIMC) control path, one or more calibration parameters to match the CFR output signal 402a to a receiver (Rx) output signal. The one or more calibration parameters may include one or more of the delay values, the gain adjust coefficients, or the phase adjust coefficients which may be sent from the PIM calibration block 410 to the delay block 412, the gain block 414, or the phase block (not shown).

In some embodiments, PIMC calibration parameters may be computed on a control path (e.g., PIMC control path 316). For a control path the data processing speed may be on the order of, e.g., about one second, which may be slower compared to the processing speed for the data path (e.g., 314), which may be on the order of, e.g., mega-samples per second. Generating a PIMC signal on the order of a second may be adequate to prevent PIM from interfering with the Rx output signal.

In some embodiments, PIMC coefficients may be computed on a control path (e.g., PIMC control path 316). The one or more PIMC coefficients may be computed for a nonlinear actuation (NA) function. The one or more PIMC coefficients may be computed by calculating a least squares solution using one or more of: closed-form using an inverse matrix, or gradient descent using a fixed step-size parameter, or conjugate-gradient descent using a dynamic step-size parameter. The PIMC coefficients may be estimated based on one or more parameters including leak factor, number of batches, batch-size, or the like. One or more of the fixed step-size parameter or the dynamic step-size parameter may be configured based on one or more of closed-loop stability, estimated noise suppression, or a time of convergence. In some examples, the one or more PIMC coefficients may be computed using a coefficient vector that may be iteratively updated after a selected amount of samples.

In some embodiments, the coefficients for the nonlinear functions $\varphi_{q,p}(.)$ may be computed by the PIM estimator block 420. The PIM estimator block 420 may be implemented as computer-readable instructions that may be executed by a processor. If a processor is not available, then the estimation may be implemented using dedicated hardware logic. The estimator may be configured to measure PIM changes over time.

In some embodiments, PIMC coefficient estimation may be computed based on a least squares equation of the form Ax=b. The solution x=argmin|Ax−b| may be computed using several methods. In one example, the solution, x, may be computed using a pseudo inverse based closed form solution (e.g., $x=(A^H A)^{-1} A^H b$).

In some embodiments, the solution, x, may be computed using computationally cheap gradient descent methods. The coefficient vector may be iteratively updated periodically, such as every sample (or block of samples) in the direction of the gradient vector in small steps, as determined by a step-size parameter. The gradient may involve simple correlation of the error signal with the input signal associated with each coefficient and may not use computationally heavy matrix inversions. The gradient step-size may be configured based on the closed-loop stability, estimation noise suppression, and time to convergence. A fixed step-size may reduce the computation time but may also suffer from long convergence times. The long convergence time may be mitigated by using a dynamic step-size based on conjugate-gradient descent technique at a cost of additional complexity.

In some embodiments, a start time or a duration for one or more of a Tx output sample or an Rx output sample may be identified to estimate one or more PIMC coefficients based on one or more of a Tx power level or an Rx interference level. In some embodiments, a sampling rate for the NA function may be computed to minimize non-linear components. In some embodiments, one or more sample-magnitude delay pairs may be computed for the NA function. In some embodiments, the NA function may be configured to cancel more than one passive intermodulation source.

In some embodiments, the PIMC coefficients may be sent to a PIMC coefficient block 422 that may be configured to interface with a nonlinear actuation block 424. The nonlinear actuation block 424 may be configured to generate an intermodulation distortion signal using the NA function. The NA function generates the intermodulation distortion signal that may be used to generate a PIMC signal to be used for PIM cancellation. Assuming $u_{NA-IN}[n]$ and $u_{NA-OUT}[n]$ are the input and output signals respectively, the NA function may be computed as:

$$u_{NA-OUT}[n] = \sum_{q=Q_1}^{Q_2} u_{NA-IN}[n-q] \sum_{p=P_1}^{P_2} \varphi_{q,p}(|u_{NA-IN}[n-p]|)$$

In some embodiments, $\varphi_{q,p}(.)$ may include nonlinear functions that may be computed in several ways including one or more of: (i) look-up Tables (LUTs), (ii) polynomials, (iii) wavelet functions, or (iv) piecewise linear (PWL) functions. In one example, a LUT may facilitate reduced computational complexity compared to other methods, but may involve a larger amount of memory compared to the other methods. In another example, a polynomial method for nonlinear functions may involve less memory compared to other methods but may use a larger amount of computations compared to other methods. In another example, a wavelet function may facilitate: (i) a computational complexity that may be lower compared to a polynomial method but higher than a LUT method, and (ii) a memory usage that is more than a polynomial method but less than an LUT method. In another example, a piecewise linear method may facilitate a computational complexity and memory usage that may be intermediate between the polynomial method and the LUT method.

In some embodiments, nonlinear functions may be computed using machine learning, neural networks, or the like. In some examples, gradient descent methods may be used to compute the nonlinear functions such as conjugate gradient descent, stochastic gradient descent (e.g., Adam deep learning optimizer), or the like.

In some embodiments, the delay limits $P_1, P_2, Q_1, Q_2$ may be fixed for an implementation or may be flexible to allow for reconfiguration of the PIMC nonlinear actuation block. This flexibility allows the nonlinear actuation to model single or multiple PIM sources by regrouping memory terms.

In some embodiments, one or more PIMC configuration parameters may be computed to generate a PIMC signal, wherein the one or more PIMC configuration parameters include one or more of: a frequency shift of the intermodulation distortion signal, a filter configuration parameter, a re-sample ratio between the Rx output signal and the CFR output signal, or a resampling timing phase adjustment between the Rx output signal and the CFR output signal. The PIMC configuration parameters may be sent from the PIMC configuration block 430 to the frequency shift block 432, the bandpass filter block 434, or the resample block 436.

In some embodiments, after being processed by the non-linear actuation block 424, a PIM configuration block may be configured to compute the frequency shift to match a frequency location of passive intermodulation in the Rx output signal. In one example, the frequency shift for the intermodulation distortion signal may be computed to align with the frequency location of the PIM signal in the Rx Output signal. In some examples, the frequency shift may be computed based on a Tx/Rx frequency allocation between an Rx band of the Rx output signal and a Tx band for the CFR output signal.

In some embodiments, the filter configuration parameters may be computed for one or more filters to: (i) remove signals outside a frequency range for the PIMC signal, (ii) remove interleaved uplink and downlink frequency bands in an Rx frequency range; or (iii) based on one or more of a Tx/Rx diplexer profile or a Tx leakage suppression condition. In some examples, the PIM configuration block 430 may be configured to compute the re-sample ratio between the Rx output signal and the CFR output signal. In one example, the PIM configuration block 430 may be configured to generate filter parameters such that the cancellation signal remains and other frequency components are filtered out.

In some embodiments, the PIMC configuration block 430 may be configured to compute a sampling rate for the NA function to minimize non-linear components. In another example, a resampling timing phase adjustment may be computed. In one example, one or more sample-magnitude delay pairs may be computed for the NA function. In one example, the PIMC configuration block 430 may be configured to send, from the PIMC control path to the PIMC data path (e.g., to the frequency shift block 432, the bandpass filter block 434, or the resample block 436), the one or more PIMC configuration parameters to generate the PIMC signal based on the intermodulation distortion signal.

In some embodiments, the signal directed into the resample block 436 may be down sampled so that the IQ sample rate of the Rx Output signal and the cancellation signal are the same. In some radios, the CFR output may be sampled at a higher sampling rate compared to the Rx signal due to DPD bandwidth expansion. For example, the Rx sample rate may be 491.52 Msps and the CFR output sample rate may be 983.04 Msps. In this example, the resample block 436 may down-sample the signal by 2× so that the CFR output sample rate matches the Rx sample rate. The down-sample ratio may be provided by the PIMC configuration block 430.

In some embodiments, an adaptive gain block (e.g., 328 in FIG. 3) may use a single tap adaptive filter to normalize the gain and the phase between the PIM signal and PIM cancellation signal. The adaptive gain block may be configured to adjust for any Automatic Gain Control (AGC), Low Noise Amplifier (LNA) related errors, or temperature effects in the gain or phase.

In some embodiments, the AGC may operate without informing the PIMC that a gain set by the AGC has changed (e.g., from x to y). The adaptive gain block (e.g., 328 in FIG. 3) may measure the change in the AGC (e.g., from x to y) using a 1 tap finite impulse response (FIR) filter. Because of fluctuations in temperature and other aging of components, the power of the signal may be variable. The adaptive gain block (e.g., 328 in FIG. 3) may be configured to record the cumulative change in gain to provide the correct amplitude to generate the PIMC signal.

In some embodiments, the PIM cancellation subtraction block (e.g., 330 in FIG. 3) may be configured to subtract the PIM cancellation signal 437*a* from the Rx output signal to generate a corrected Rx signal. The corrected Rx signal may have a higher signal quality which may result in receiver sensitivity improvement.

Figure 5A:
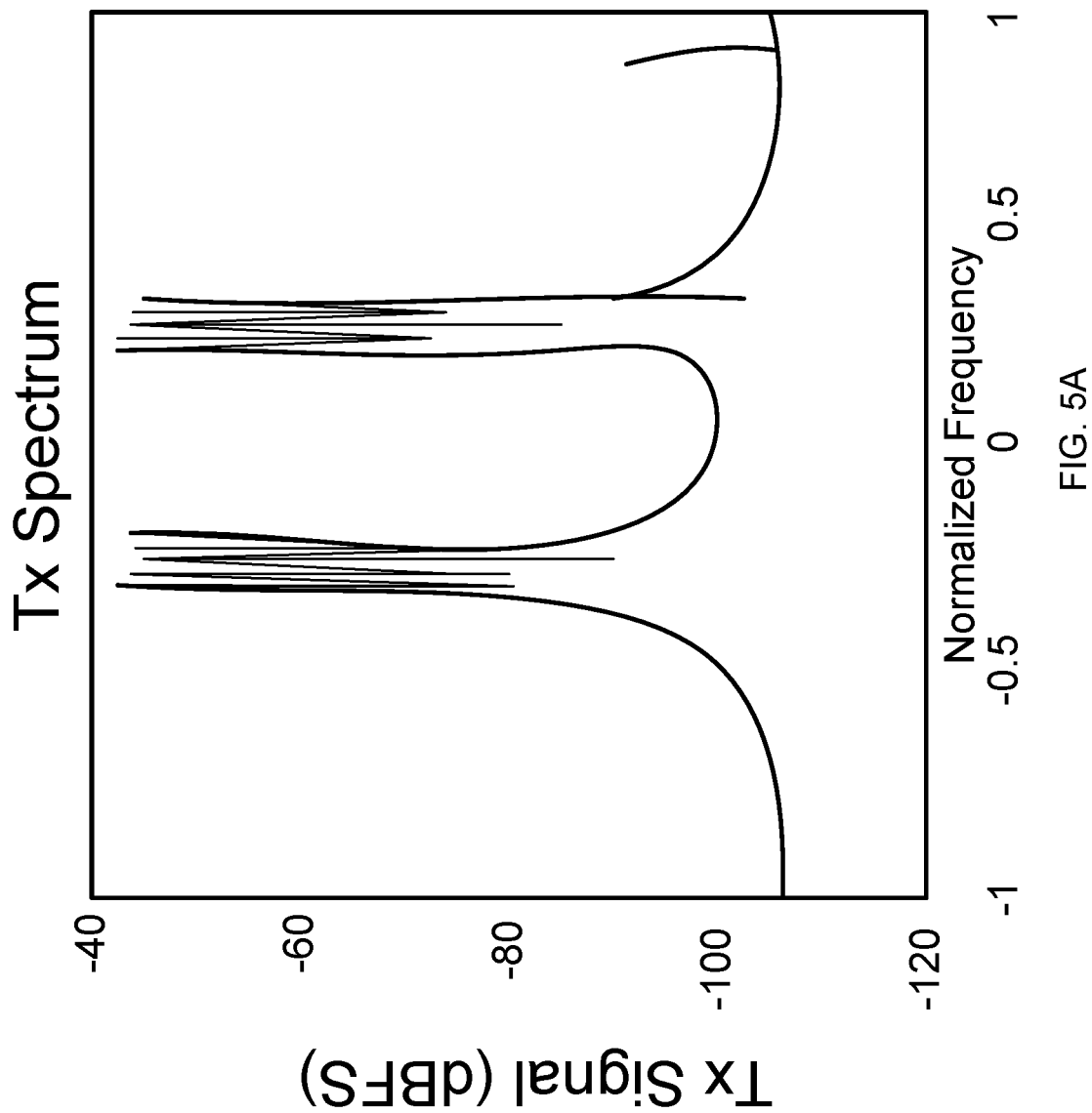
FIG. 5A-5C illustrate an example of passive intermodulation cancellation.
Figure 5B:
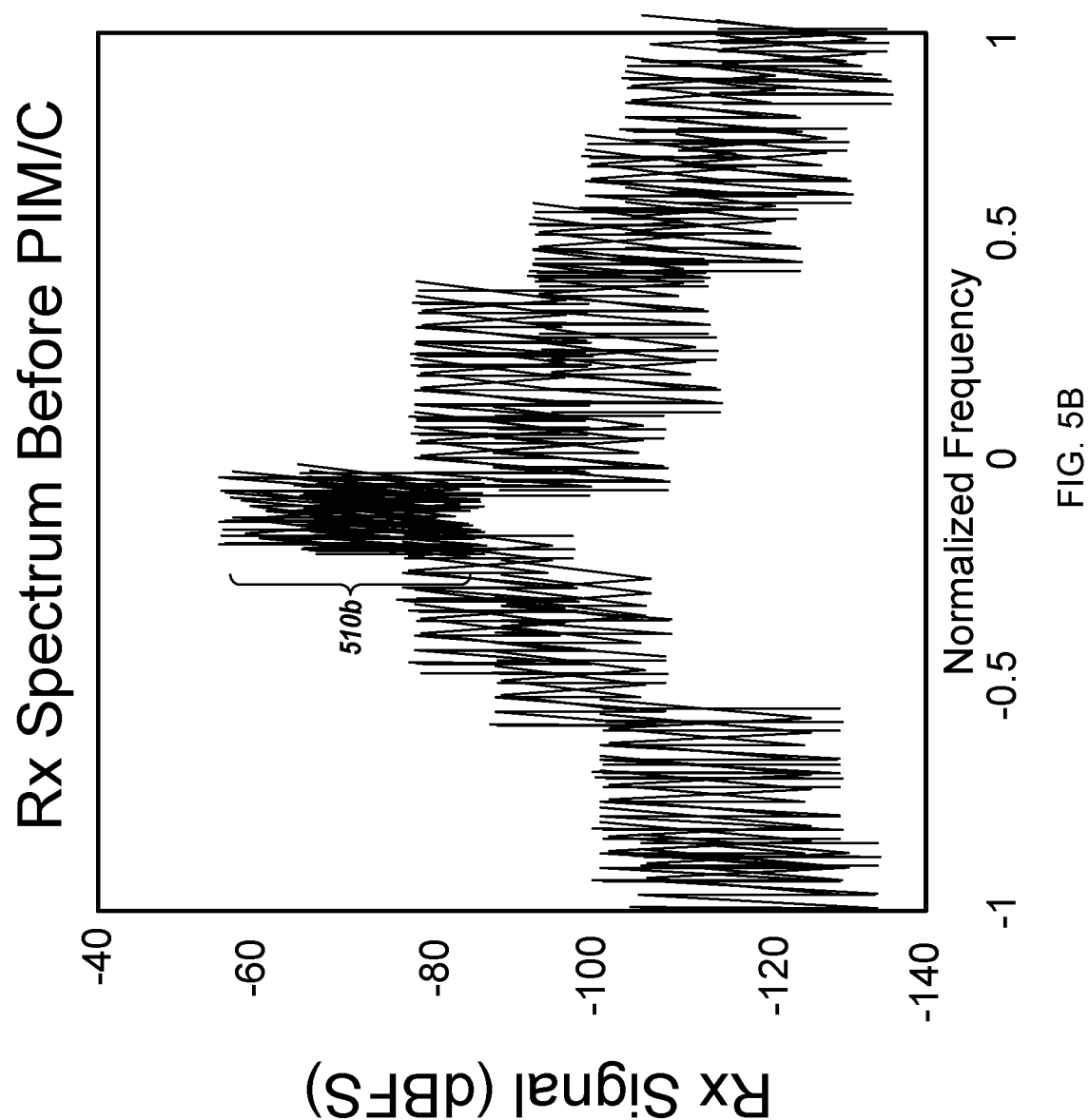
Figure 5C:
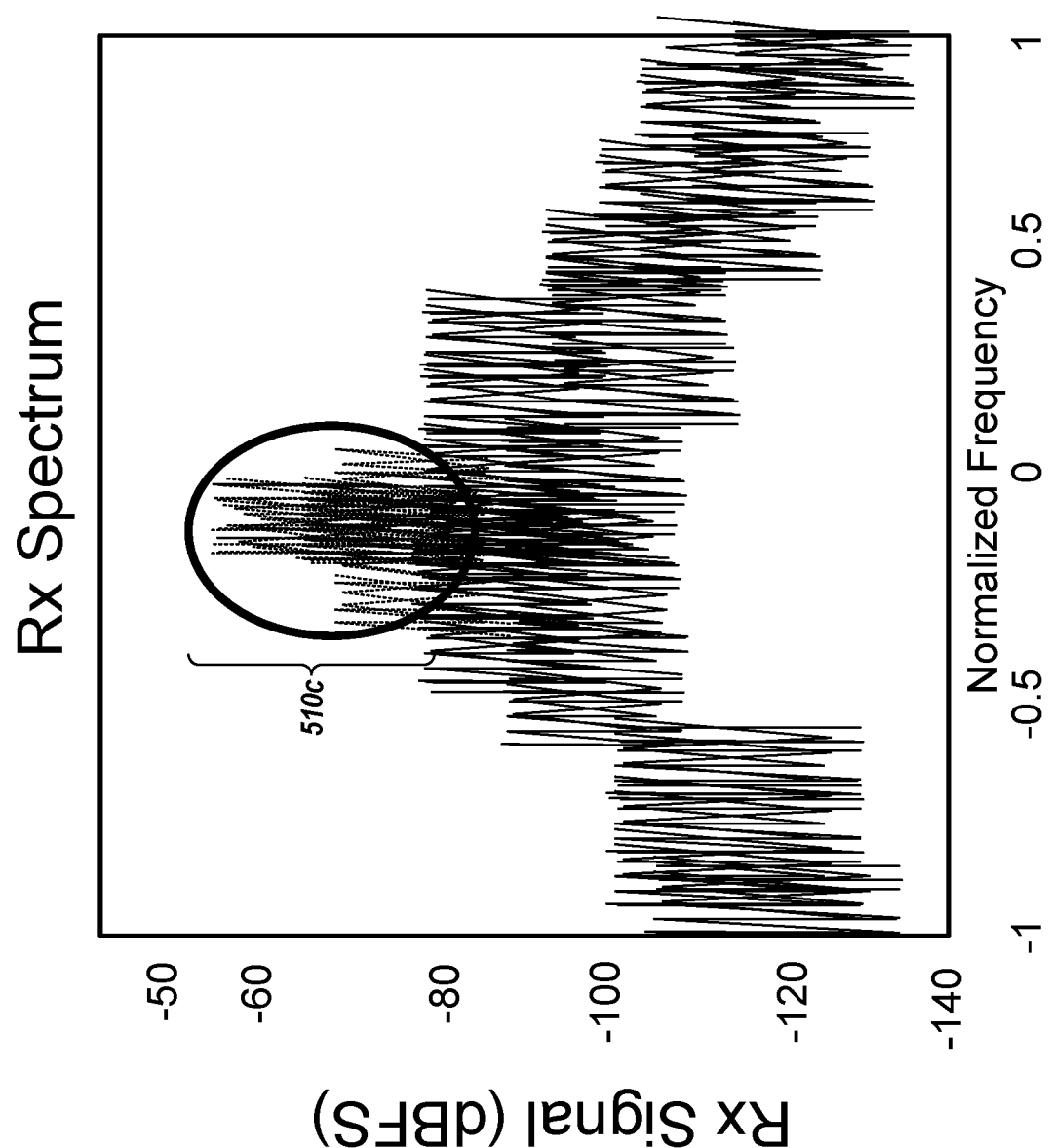

In one example, as illustrated in FIG. 5A, a graph of the normalized frequency (having a normalized range from −1 to 1) and the Tx signal (measured in decibels measured relative to full scale, dBFS) shows two peaks (e.g., at about −0.3 and at about 0.3). As illustrated in FIG. 5B, a graph of the normalized frequency (having a normalized range from −1 to 1) and the Rx signal before PIMC (measured in decibels measured relative to full scale, dBFS) shows a peak 510*b* (e.g., at about −0.1). As illustrated in FIG. 5C, when the PIMC has been applied, the peak in the middle 501*c* has been removed (as shown using dotted lines instead of solid lines). As a consequence of removing the PIM, the graph in FIG. 5C displays greater than 20 dB of receiver sensitivity increase.

In some embodiments, passive intermodulation may be generated by a plurality of sources. For example, in an environment with multiple user equipments (UEs), each UE may contribute to passive intermodulation. In some examples, passive intermodulation may arise internally from the communication device and also externally from different types of sources such as a rusty nail, a chain link fence, various kinds of metal-to-metal contact, or the like. The presence of a plurality of PIM sources may be identified during the time alignment calibration process (e.g., by the identification of multiple cross correlation peaks with each peak corresponding to a PIM source.).

Figure 6:
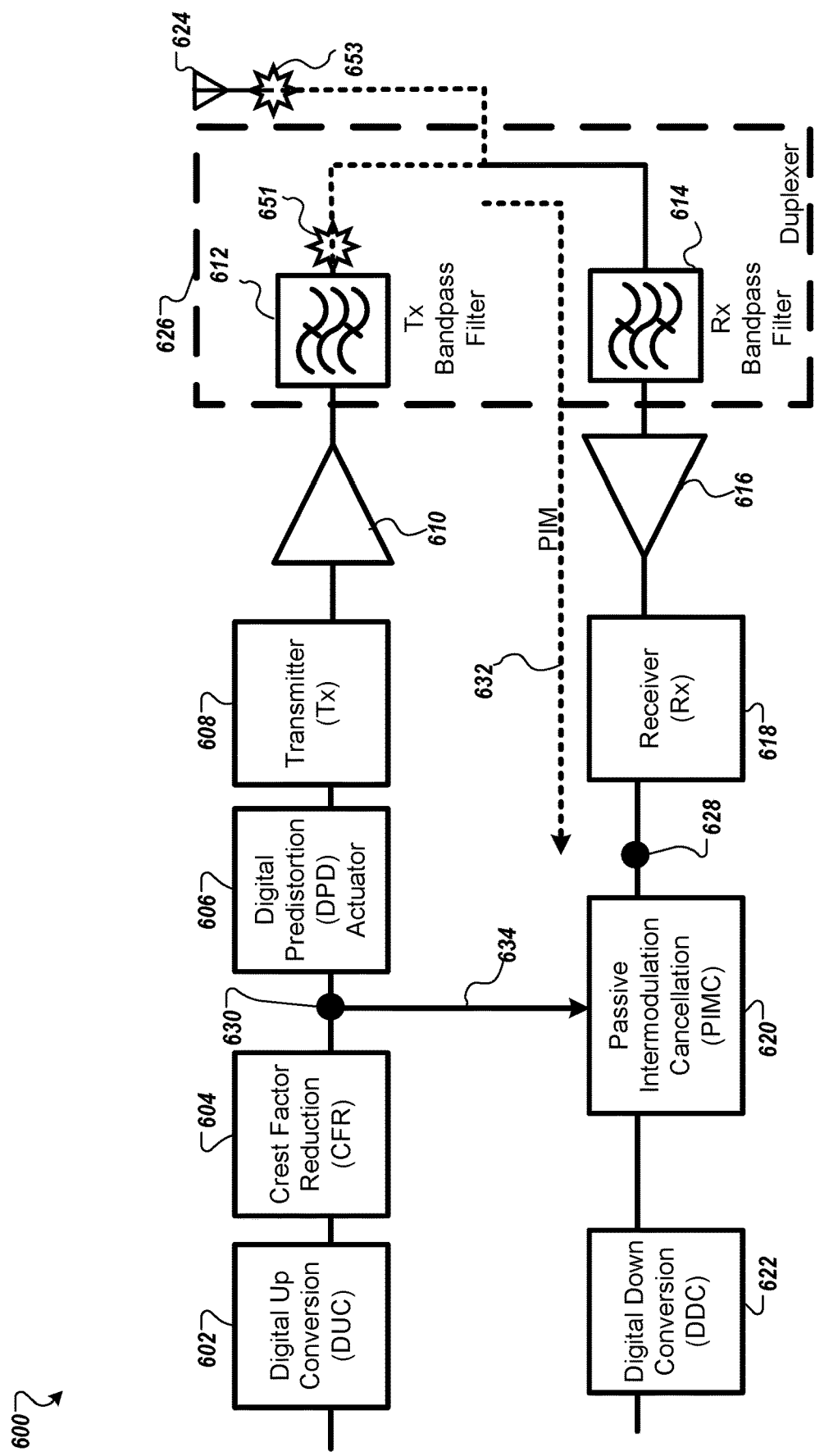
FIG. 6 illustrates an example communication system configured to cancel passive intermodulation generated by multiple sources.

In some embodiments, as illustrated in FIG. 6, a communication device 600 (e.g., a base station) may be configured for enhanced receiver sensitivity. The communication device 600 may be configured to cancel passive intermodulation from a plurality of sources. In some examples, the plurality of sources may include a plurality of internal sources 651, 653 (i.e., sources arising from the base station). The communication device 600 may comprise a receiver (Rx) 618 configured to receive and send an Rx output signal 628 in an Rx band, wherein the Rx output signal 628 has a first passive intermodulation (PIM) source 651 in the Rx band and a second PIM source 653 in the Rx band. The PIMC 620 may comprise a processing device. The processing device may be configured to receive the Rx output signal 628 from the receiver 618 on an Rx path, and receive a crest factor reduction (CFR) output signal 630 from a CFR on a transmit (Tx) path (e.g., 634). The processing device may be configured to identify the first PIM source 651 and the second PIM source 653 based on the Rx output signal 628 and the CFR output signal 630, and calibrate the CFR output signal 630 based on the first 651 and second 653 PIM sources in the Rx output signal to generate a non-linear actuation (NA) input signal. The processing device may be configured to generate an intermodulation distortion signal by using an NA function on the NA input signal.

In some embodiments, the communication device 600 (e.g., base station) may comprise one or more of a DUC 602, a CFR 604, a DPD 606, a Tx 608, a low noise amplifier 610, a Tx bandpass filter 612, an Rx bandpass filter 614, a power amplifier 616, an Rx 618, a PIMC 620, and a DDC 622, an antenna 624, a duplexer 626, or the like, each of which may be configured as otherwise provided herein.

In some embodiments, the PIMC 620 may be configured to generate a PIMC signal for the plurality of PIM sources. In one example, the PIMC 620 may be configured to calibrate the CFR output signal 630 based on one or more time delay coefficients for the first PIM source 651 and one or more time delay coefficients for the second PIM source 653. In another example, the PIMC 620 may be configured to calibrate the CFR output signal 630 based on one or more gain adjust coefficients and/or phase adjust coefficients.

In some embodiments, the PIMC 620 may be configured to adjust one or more delay limits in the NA function based on an identification of the first 651 and second 653 PIM sources in the Rx output signal 628. The first 651 and second 653 PIM sources may be present in the passive intermodulation signal 632 that may be present in the corrupted Rx output signal (e.g., 628 before PIMC). The first 651 and second 653 PIM sources in the Rx output signal 628 may be identified by identifying a first cross-correlation peak and a second cross-correlation peak. The PIMC 620 may be configured to identify one or more memory elements storing the one or more delay limits in a memory device to model the first and second PIM sources.

In some embodiments, the PIMC 620 may be configured to select, in real-time, a number of PIM sources to cancel. The number of PIM sources may include the first 651 and second 653 PIM sources. The first PIM source 651 may be allocated to a first set of nonlinear terms in a nonlinear function in the NA function. The second PIM source 653 may be allocated to a second set of nonlinear terms in a nonlinear function in the NA function. The PIMC 620 may be configured to generate the intermodulation distortion signal. The intermodulation distortion signal may be configured to cancel the first PIM source 651 using the first set of nonlinear terms, and the second PIM source 653 using the second set of nonlinear terms. The PIMC 620 nonlinear actuation block may be configured to cancel either one PIM source or multiple PIM sources (e.g., 651 and 653) by regrouping of the non-linear terms, where each group is selected to correct one PIM source.

In some embodiments, the PIMC 620 may be configured to analyze the Rx output signal 628 to identify the number of PIM sources. When a plurality of PIM sources are identified as being present, the relative physical distances between pairs of the plurality of PIM sources may be computed based on echoes in the signal having PIM (e.g., in the Rx output signal 628).

Figure 7:
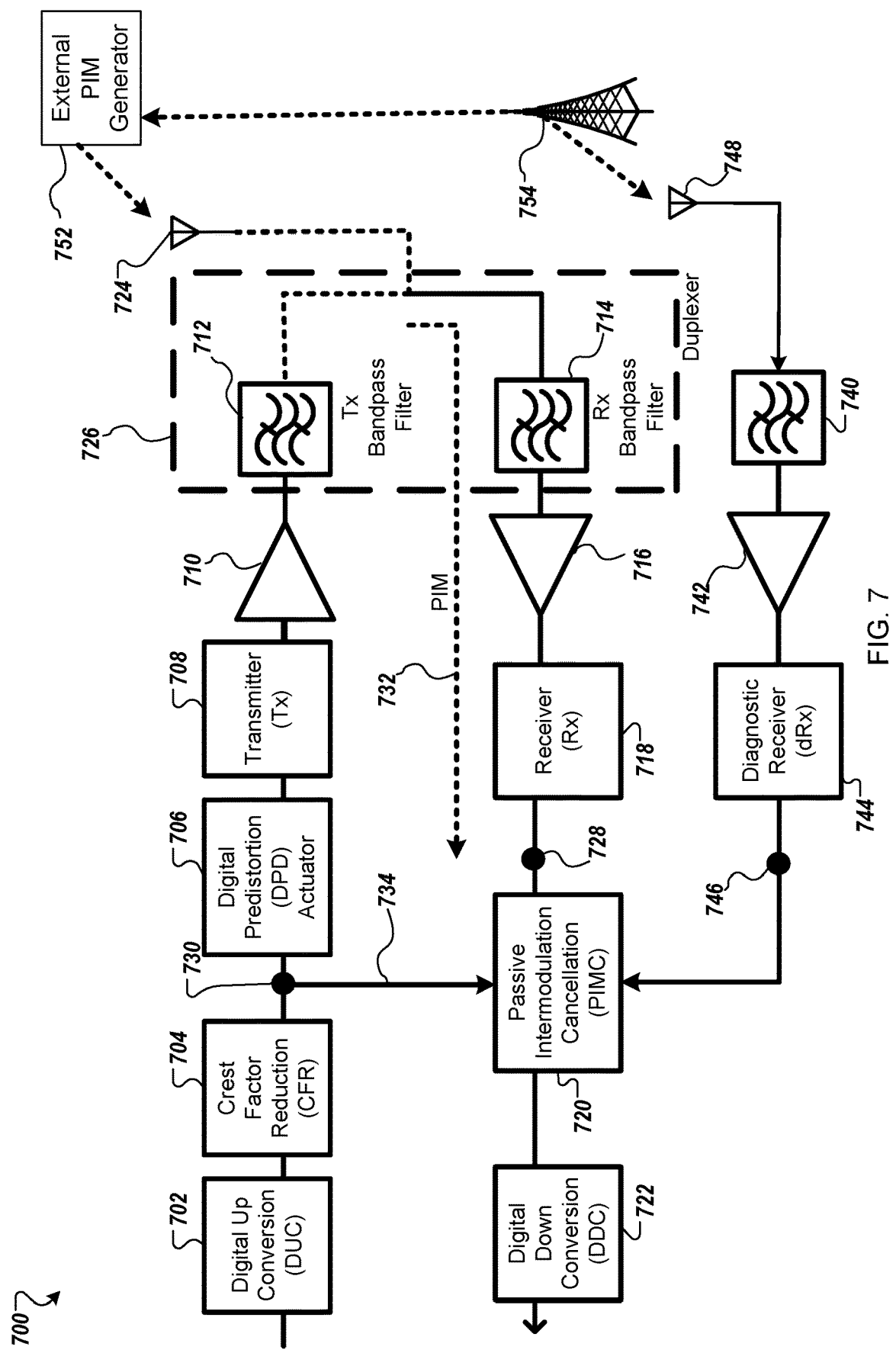
FIG. 7 illustrates an example communication system configured to cancel internal and external passive intermodulation.

In some embodiments, as illustrated in FIG. 7, a plurality of PIM sources (e.g., 728, 752, 754) may be present internally and externally. When the plurality of PIM sources comprise internal PIM sources 732 and external PIM sources 752, 754, the intermodulation generated by the internal PIM source 732 and the intermodulation generated by the external PIM source 752, 754 may be separated by using a CFR output signal 730 as a source of the internal PIM 732 and a diagnostic receiver (dRx) output signal as a source for the external PIM 752, 754. The source of the external PIM source 752, 754 may comprise an external communication device 752, 754 (e.g., a UE) that may not be accessible to the communication device 700. The dRx receiver path (e.g., bandpass filter 740, low noise amplifier 742, and dRx 744) may be used to receive a dRx output signal 746 that may be used to receive parameters associated with the external communication device 752, 754.

In some embodiments, a communication device 700 may be configured to cancel PIM from an internal source 732 and an external source 752, 754. The communication device 700 (e.g., a base station) may be configured for enhanced receiver sensitivity. The communication device 700 may comprise a receiver (Rx) path (e.g., Rx bandpass filter 714, low noise amplifier 716, Rx 718) configured to receive an Rx output signal 728. The communication device 700 may comprise a diagnostic receiver (dRx) path (e.g., bandpass filter 740, low noise amplifier 742, dRx 744) configured to receive a dRx output signal 746. The dRx output signal 746 may comprise an external PIM source (e.g., 752 or 754). Although the Rx 718 and the dRx 744 have been illustrated as separate blocks on separate receive paths, different configurations may be possible including configurations in which the Rx 718 and dRx 744 are in the same block and/or on the same path.

In some embodiments, the communication device 700 may comprise a processing device configured to receive the Rx output signal 728 from the receiver path and receive the dRx output signal 746 from the dRx path. The processing device may be configured to calibrate the dRx output signal 746 based on the Rx output signal 728 to generate a dRx non-linear actuation (NA) input signal. The processing device may be configured to generate a dRx intermodulation distortion signal by using a dRx NA function on the dRx NA input signal. The processing device may comprise a transmit (Tx) path configured to transmit a crest factor reduction (CFR) output signal 730 in a Tx band which may be communicated via the path 734.

In some embodiments, the communication device 700 may comprise one or more additional components including a DUC 702, a CFR 704, a DPD 706, a Tx 708, a low noise amplifier 710, a Tx bandpass filter 712, an Rx bandpass filter 714, a power amplifier 716, an Rx 718, a PIMC 720, and a DDC 722, an antenna 724, a duplexer 726, a diagnostic antenna 748, or the like, each of which may be configured as otherwise provided herein.

In some embodiments, the PIMC 700 may include a flexible architecture that allows the same PIM cancellation block to be configured to: (i) allocate all available resources to cancel PIM from one source, (ii) share available resources uniformly or non-uniformly to cancel PIM from multiple sources, (iii) and/or deploy single-source or multiple-source PIM cancellation based on a real-time computation.

Figure 8:
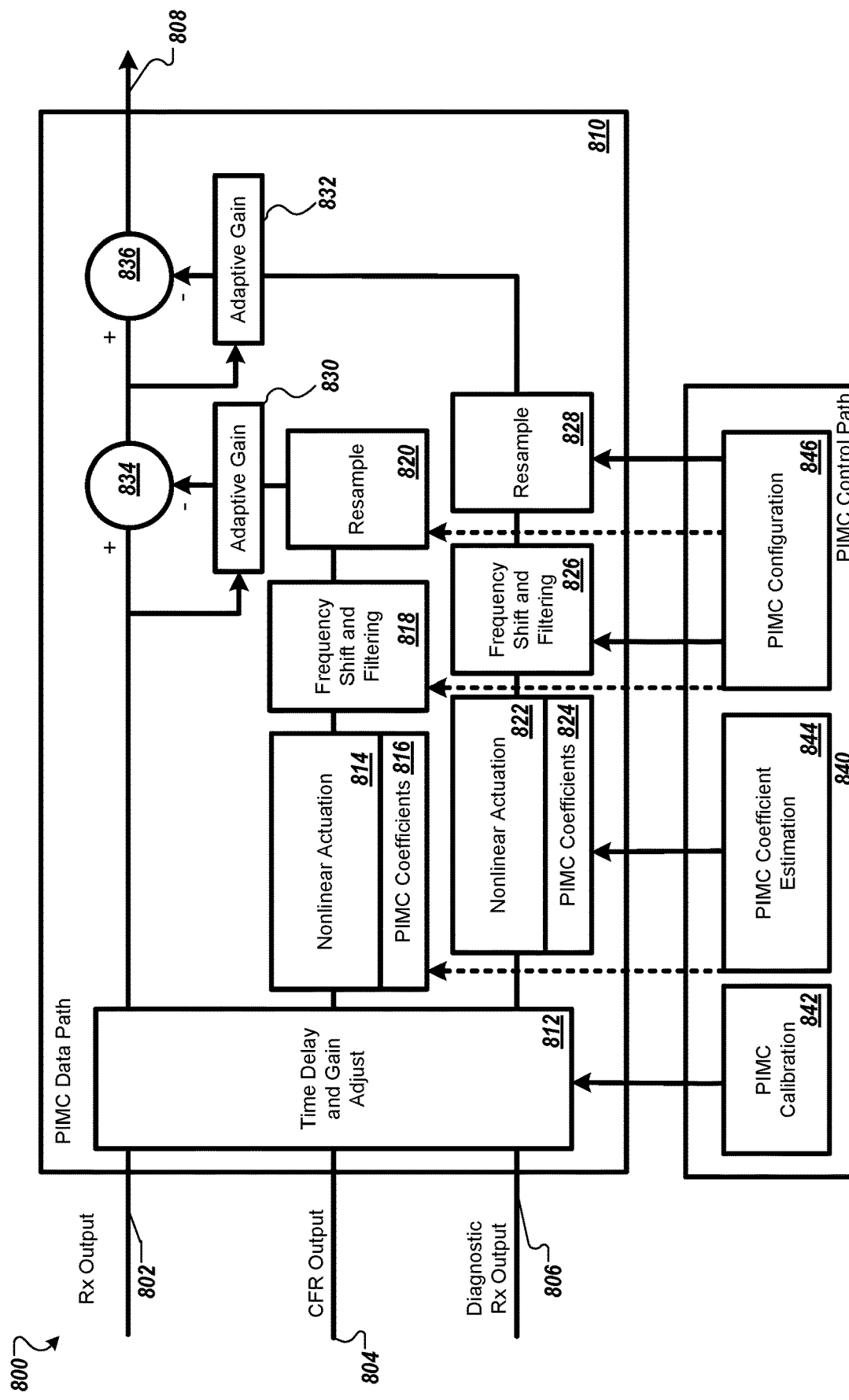
FIG. 8 illustrates an example block diagram showing the data path and control path for internal and external passive intermodulation cancellation.

In some embodiments, as illustrated in FIG. 8, the functionality 800 for the PIMC 720 may comprise a PIMC data path 810 and a PIMC control path 840. The PIMC data path 810 may comprise one or more of: a time delay and gain adjust block 812, a first nonlinear actuator block 814, a first PIMC coefficient block 816, a first frequency shift and filtering block 818, a first resample block 820, a first adaptive gain block 830, or a first subtractor 834. The PIMC data path 810 may further comprise one or more of: a second nonlinear actuation block 822, a second PIMC coefficient block 824, a second frequency shift and filtering block 826, a second resample block 828, a second adaptive gain block 832, or a second subtractor 836. In some embodiments, the PIMC control path 840 may comprise a PIMC calibration block 842, a PIMC coefficient block 844, and a PIMC configuration block 846.

In some embodiments, the PIMC data path 810 may be configured to receive an Rx output signal 802, a CFR output signal 804, and a diagnostic Rx output signal 806. The Rx output signal 802 may be received from an internal source. The dRx output signal 806 may be received from the dRx path. The PIMC data path 810 may be configured to calibrate the dRx output signal 806 based on the Rx output signal 802 to generate a dRx non-linear actuation (NA) input signal.

The PIMC data path 810 may be configured to generate a dRx intermodulation distortion signal by using a dRx NA function on the dRx input signal. The PIMC data path 810 may be configured to generate a corrected Rx signal 808.

In some embodiments, the PIMC data path block 810 may be configured to calibrate the CFR output signal 804 based on the Rx output signal 802 to generate a Tx non-linear actuation (NA) input signal, and generate a Tx intermodulation distortion signal by using a Tx NA function on the Tx NA input signal.

In some embodiments, the time delay and gain adjust block 812 may be configured to calibrate the dRx output signal 806 based on one or more time delay coefficients, and calibrate the dRx output signal 806 based on one or more gain adjust coefficients and/or phase adjust coefficients. The time delay and gain adjust block 812 may be configured to receive PIMC configuration parameters (e.g., time delay coefficients, gain adjust coefficients, or phase adjust coefficients) from the PIMC calibration block 842.

In some embodiments, the dRx NA function may be computed using a non-linear function including one or more of: a look-up table (LUT), a polynomial, a wavelet function, a piecewise linear (PWL) function, or the like. The non-linear function may be computed using one or more passive intermodulation cancellation (PIMC) coefficients. The PIMC coefficients may be estimated by computing a least squares solution, as shown in block 844. The PIMC coefficients may be sent to the PIMC coefficient block 816 for use by the nonlinear actuation block 814.

In some embodiments, the PIMC data path 810 may comprise one or more filters configured to remove signals outside a frequency range for a PIMC signal as computed based on a frequency shift of the dRx intermodulation distortion signal, as shown in block 818. The one or more filters may include a multi-band filter configured to select an Rx frequency range to remove interleaved uplink and downlink frequency bands in the Rx output signal 802.

In some embodiments, the PIMC data path 810 may comprise a resample block 820 configured to align the sampling rate of the incoming signal (e.g., the signal received after frequency shifting and filtering from block 818) to the sampling rate of the outgoing signal (e.g., the corrected Rx signal 808).

In some embodiments, the PIMC configuration block 846 may compute one or more dRx PIMC configuration parameters include: a frequency shift of the dRx intermodulation distortion signal, a dRx filter configuration parameter, a re-sample ratio between the Rx output signal 802 and the dRx output signal 806, or a resampling timing phase adjustment between the Rx output signal 802 and the dRx output signal 806.

In some embodiments, the PIMC data path 810 may comprise an adaptive filter 830 configured to adjust a gain and/or phase of the dRx intermodulation distortion signal based on an automatic gain control (AGC) error, a low noise amplifier (LNA) error, or a temperature-induced error.

In some embodiments, the PIMC data path 810 may comprise a PIMC subtractor 834 configured to generate a corrected Rx signal 808 based on the dRx intermodulation distortion signal and the Rx output signal 802.

In some embodiments, the PIMC data path 810 may comprise an on-board calibration unit configured to calibrate the dRx output signal 806 based on the Rx output signal 802 using adaptive calculation and adaptive adjustment. The PIMC data path 810 may comprise an on-board coefficient estimation engine configured to compute the NA function using one or more passive intermodulation cancellation (PIMC) coefficients that may calculated and updated based on radio traffic data.

In some embodiments, the PIMC control path 840 may be configured as software (such as is run on a computer system or a dedicated machine), Alternatively or in addition, the functionality of the PIMC control path 840 may be implemented on the PIMC data path 810 using processing logic that may include hardware (circuitry, dedicated logic, etc.).

In some embodiments, the PIMC control path 840 may include one or more of a PIMC calibration block 842, a PIMC coefficient estimation block 844, or a PIMC configuration block 846. The PIMC calibration block 842 may be configured to compute one or more diagnostic receiver (dRx) calibration parameters to match a dRx output signal 806 to a receiver (Rx) output signal 802 in which the dRx output signal 806 may have an external source. The PIMC calibration block 842 may be configured to send the one or more dRx calibration parameters to the time delay and gain adjust block 812.

In some embodiments, the PIMC calibration block 842 may be configured to compute one or more time delay coefficients based on one or more of a round-trip delay, a cross-correlation, a mean squared error between the dRx output signal 806 and the Rx output signal 802, or the like. Alternatively, or in addition, the PIMC calibration block 842 may be configured to compute one or more alignment parameters including one or more of a sample alignment parameter or a sub-sample alignment parameter. Alternatively, or in addition, the PIMC calibration block 842 may be configured to compute the one or more gain adjust coefficients and/or phase adjust coefficients based on one or more of: a gain-adjustment match and/or phase adjustment match between the dRx output signal 806 and a dRx NA function input signal.

In some embodiments, the PIMC coefficient estimation block 844 may be configured to compute one or more dRx PIMC coefficients for a dRx nonlinear actuation (NA) function, and send, from the PIMC control path 840 to a PIMC data path 810, the one or more dRx PIMC coefficients to generate a dRx intermodulation distortion signal based on the dRx NA function. In some embodiments, the PIMC coefficient estimation block 844 may be configured to compute the one or more dRx PIMC coefficients by calculating a least squares solution using one or more of: (i) closed-form using an inverse matrix, (ii) gradient descent using a fixed step-size parameter, or (iii) conjugate-gradient descent using a dynamic step-size parameter. In some examples, the dRx PIMC coefficients may be estimated based on one or more parameters including leak factor, number of batches, batch-size, or the like. In some examples, the fixed step-size parameter or the dynamic step-size parameter may be configured based on one or more of closed-loop stability, estimated noise suppression, a time of convergence, or the like. In some examples, the PIMC coefficient estimation block 844 may be configured to compute a coefficient vector including the dRx PIMC coefficients that may be iteratively updated after a selected amount of samples.

In some embodiments, the PIMC configuration block 846 may be configured to compute one or more dRx PIMC configuration parameters to generate a dRx PIMC signal. The one or more dRx PIMC configuration parameters may include: a frequency shift of the dRx intermodulation distortion signal, a dRx filter configuration parameter, a re-sample ratio between the Rx output signal 802 and the dRx output signal 806, a resampling timing phase adjustment between the Rx output signal 802 and the dRx output signal

806. The PIMC configuration block 846 may be configured to compute send, from the PIMC control path 840 to the PIMC data path 810, the one or more dRx PIMC configuration parameters to generate the dRx PIMC signal based on the dRx intermodulation distortion signal.

In some embodiments, the PIMC configuration block 846 may be configured to compute the frequency shift to match a frequency location of dRx passive intermodulation in the Rx output signal 802. The frequency shift may be based on a frequency allocation between an Rx band of the Rx output signal 802 and a frequency band for the dRx output signal 806.

In some embodiments, the PIMC configuration block 846 may be configured to compute the dRx filter configuration parameters for one or more filters to: (i) remove signals outside a frequency range for the dRx PIMC signal; or (ii) remove interleaved uplink and downlink frequency bands in an Rx frequency range.

In some embodiments, the PIMC configuration block 846 may be configured to compute the re-sample ratio between the Rx output signal 802 and the dRx output signal 806. In some examples, the PIMC configuration block 846 may be configured to compute one or more sample-magnitude delay pairs for the dRx NA function. In some examples, the PIMC configuration block 846 may be configured to compute a sampling rate for the dRx NA function to minimize non-linear components.

In some embodiments, an adaptive gain block (e.g., 830, 832) may be configured to facilitate a gain-adjustment and/or phase adjustment based on: (i) an automatic gain control (AGC) radio frequency (RF) attenuation state for the Rx output signal, or (ii) a variation induced by temperature or component age.

In some embodiments, various parameters associated with the dRx output signal or the Rx output signal may be used to compute dRx PIMC coefficients. In one example, the one or more dRx PIMC coefficients may be computed at the PIMC coefficient estimation block 844 based on one or more of the dRx power level or the Rx interference level. The PIMC coefficient estimation block 844 may be configured to compute one or more of a start time or a duration for a dRx output sample to calculate a dRx power level. The PIMC coefficient estimation block 844 may be configured to compute one or more of a start time or a duration for an Rx output sample to calculate an Rx interference level.

In some embodiments, a dRx PIMC bypass signal may be generated. The dRx PIMC bypass signal may be computed when one or more of: (i) an antenna is being calibrated, (ii) a PA protection procedure is being performed, or (iii) dRx PIM is not detected based on one or more of a frequency allocation or an estimated dRx PIM correction level.

In some embodiments, a transmitting intermodulation distortion signal may be generated to remove PIM for a transmitted signal. In one example, the PIMC calibration block 842 may be configured to: (i) compute one or more transmit (Tx) calibration parameters to match a CFR output signal 804 to a receiver (Rx) output signal, (ii) compute one or more Tx PIMC coefficients for a Tx actuation (NA) function, and (iii) send, from the PIMC control path 840 to a PIMC data path 810, the one or more Tx calibration parameters and the one or more Tx PIMC coefficients to generate a Tx intermodulation distortion signal based on the Tx NA function.

Figure 9:
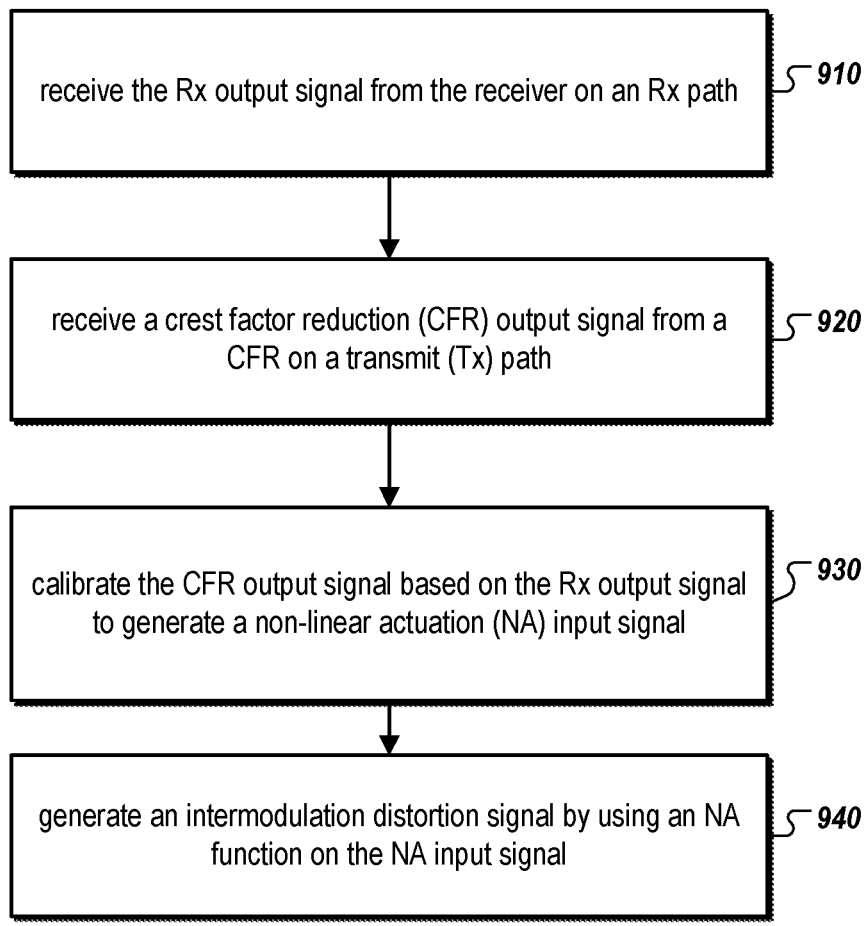
FIG. 9 illustrates a process flow of a base station configured for enhanced receiver sensitivity.

FIG. 9 illustrates a process flow of an example method 900 for enhanced receiver sensitivity, in accordance with at least one embodiment described in the present disclosure. The method 900 may be arranged in accordance with at least one embodiment described in the present disclosure.

Figure 14:
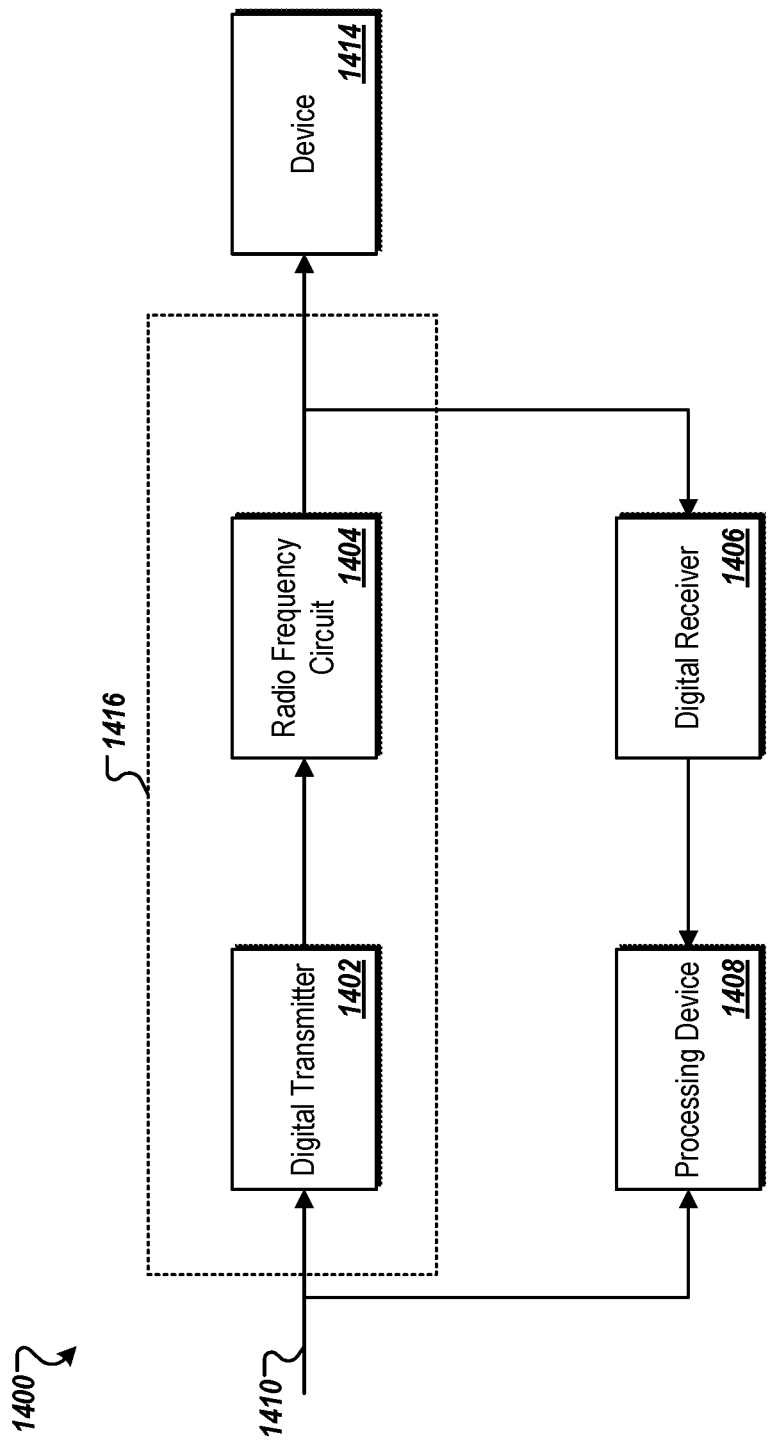
FIG. 14 illustrates an example communication system in accordance with an example.

The method 900 may be performed by processing logic that may include hardware (circuitry, dedicated logic, etc.), software (such as is run on a computer system or a dedicated machine), or a combination of both, which processing logic may be included in the processor 1454 of FIG. 14, or another device, combination of devices, or systems.

The method 900 may begin at block 910 where the processing logic may be configured to receive the Rx output signal from the receiver on an Rx path.

At block 920, the processing logic may receive a crest factor reduction (CFR) output signal from a CFR on a transmit (Tx) path.

At block 930, the processing logic may calibrate the CFR output signal based on the Rx output signal to generate a non-linear actuation (NA) input signal.

At block 940, the processing logic may generate an intermodulation distortion signal by using an NA function on the NA input signal.

Modifications, additions, or omissions may be made to the method 900 without departing from the scope of the present disclosure. For example, in some embodiments, the method 900 may include any number of other components that may not be explicitly illustrated or described.

Figure 10:
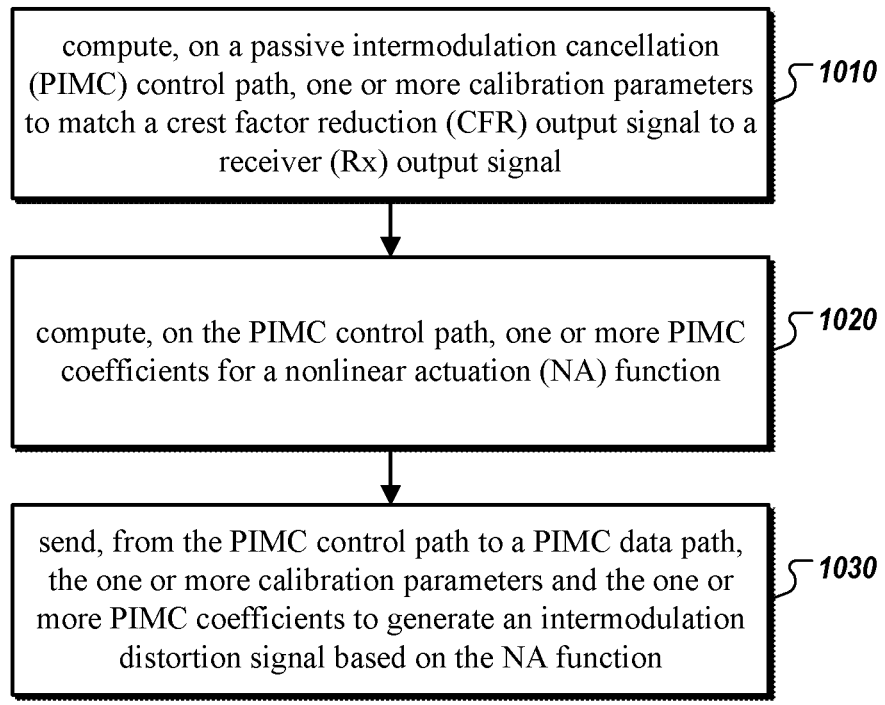
FIG. 10 illustrates a process flow for a computer readable medium used for enhanced receiver sensitivity.

FIG. 10 illustrates a process flow of an example method 1000 that may be used for enhanced receiver sensitivity, in accordance with at least one embodiment described in the present disclosure. The method 1000 may be arranged in accordance with at least one embodiment described in the present disclosure.

The method 1000 may be performed by processing logic that may include hardware (circuitry, dedicated logic, etc.), software (such as is run on a computer system or a dedicated machine), or a combination of both, which processing logic may be included in the processing device 1454 of FIG. 14, or another device, combination of devices, or systems.

The method 1000 may begin at block 1010 where the processing logic may compute, on a passive intermodulation cancellation (PIMC) control path, one or more calibration parameters to match a crest factor reduction (CFR) output signal to a receiver (Rx) output signal.

At block 1020, the processing logic may compute, on the PIMC control path, one or more PIMC coefficients for a nonlinear actuation (NA) function.

At block 1030, the processing logic may send, from the PIMC control path to a PIMC data path, the one or more calibration parameters and the one or more PIMC coefficients to generate an intermodulation distortion signal based on the NA function.

Modifications, additions, or omissions may be made to the method 1000 without departing from the scope of the present disclosure. For example, in some embodiments, the method 1000 may include any number of other components that may not be explicitly illustrated or described.

Figure 11:
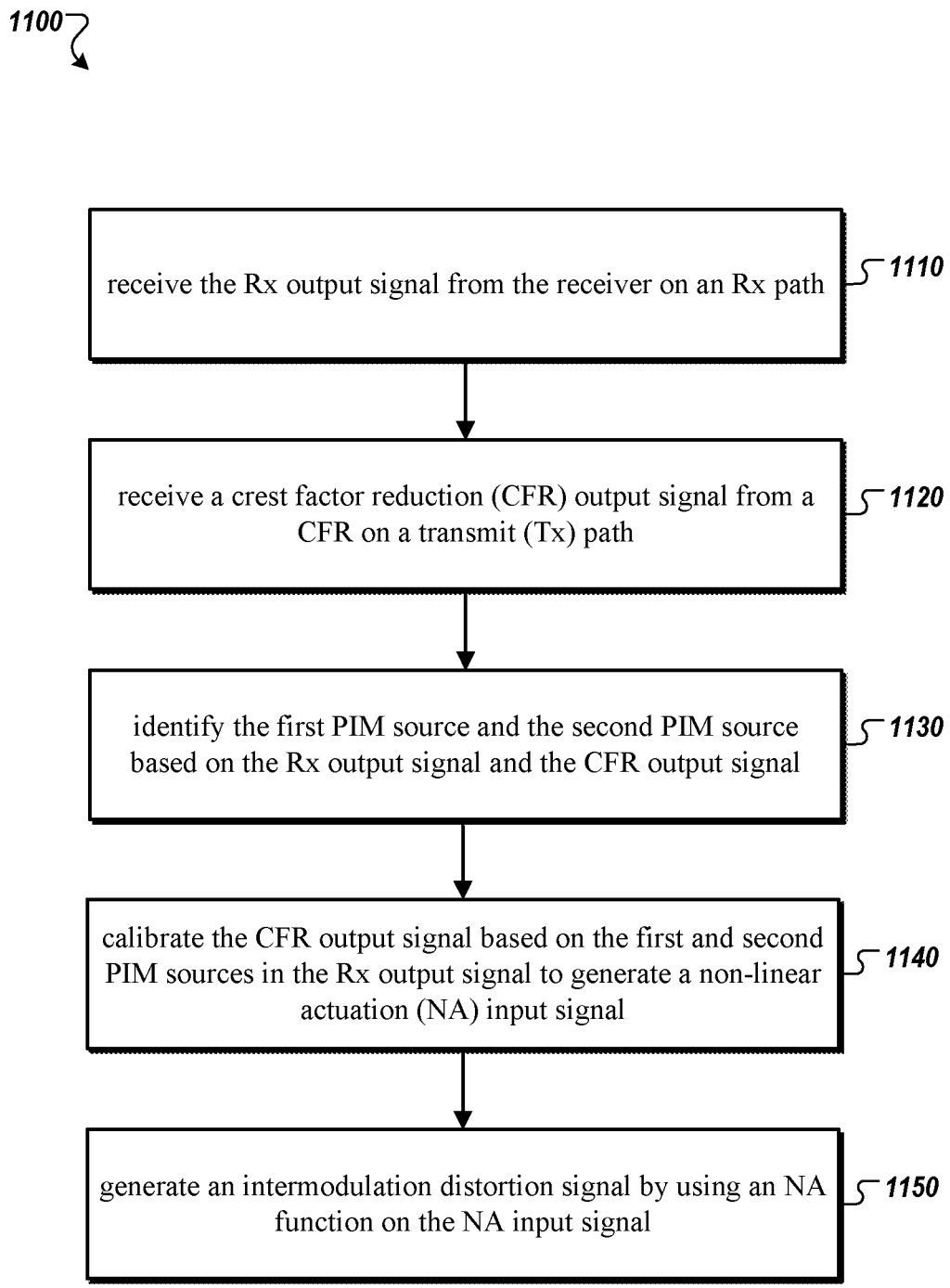
FIG. 11 illustrates a process flow of a base station configured for enhanced receiver sensitivity.

FIG. 11 illustrates a process flow of an example method 1700 that may be used for enhanced receiver sensitivity, in accordance with at least one embodiment described in the present disclosure. The method 1100 may be arranged in accordance with at least one embodiment described in the present disclosure.

The method 1100 may be performed by processing logic that may include hardware (circuitry, dedicated logic, etc.), software (such as is run on a computer system or a dedicated machine), or a combination of both, which processing logic may be included in the processing device 1454 of FIG. 14, or another device, combination of devices, or systems.

The method 1100 may begin at block 1110 where the processing logic may receive the Rx output signal from the receiver on an Rx path.

At block 1120, the processing logic may receive a crest factor reduction (CFR) output signal from a CFR on a transmit (Tx) path.

At block 1130, the processing logic may identify the first PIM source and the second PIM source based on the Rx output signal and the CFR output signal.

At block 1140, the processing logic may calibrate the CFR output signal based on the first and second PIM sources in the Rx output signal to generate a non-linear actuation (NA) input signal.

At block 1150, the processing logic may generate an intermodulation distortion signal by using an NA function on the NA input signal.

Modifications, additions, or omissions may be made to the method 1100 without departing from the scope of the present disclosure. For example, in some embodiments, the method 1100 may include any number of other components that may not be explicitly illustrated or described.

Figure 12:
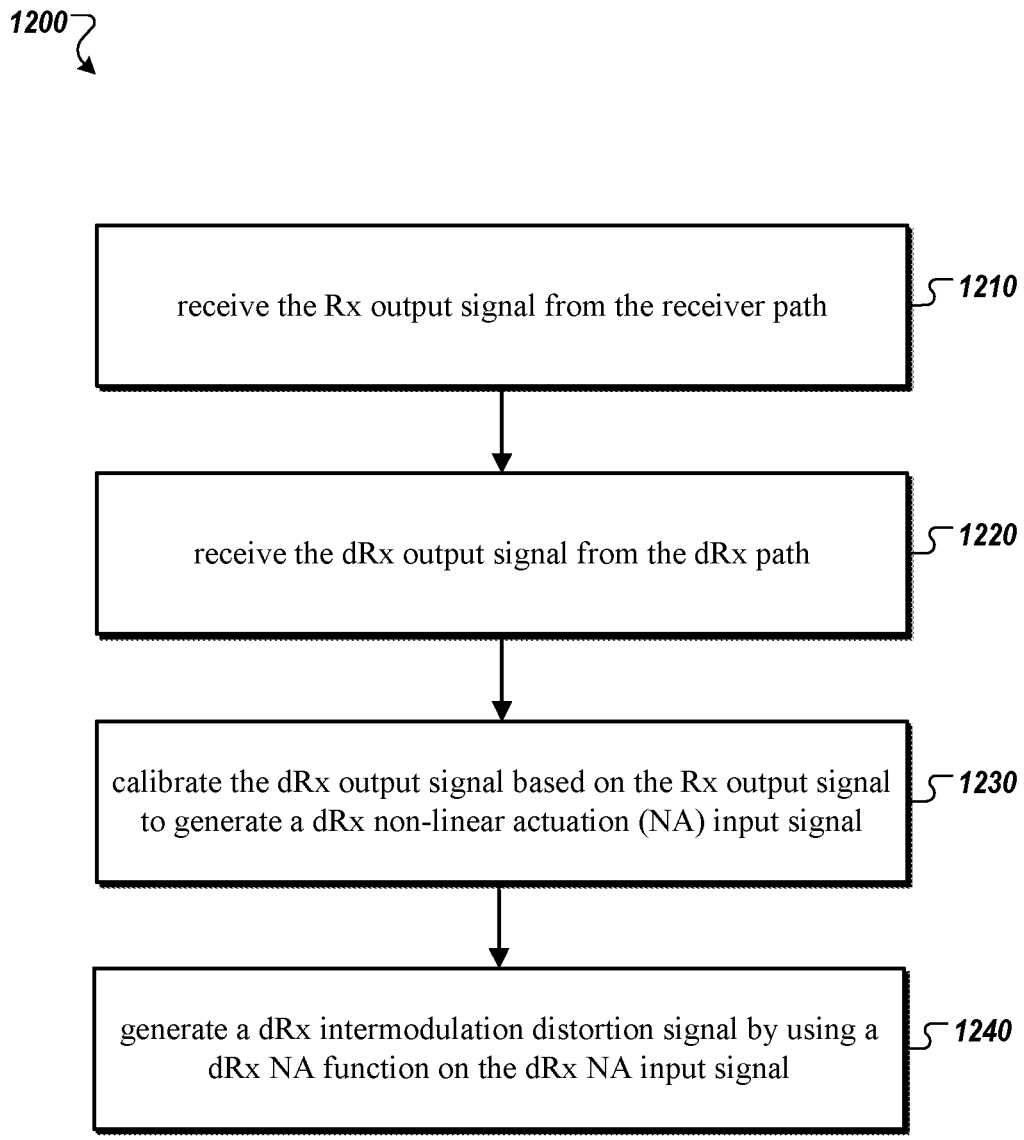
FIG. 12 illustrates a process flow of a base station configured for enhanced receiver sensitivity.

FIG. 12 illustrates a process flow of an example method 1200 that may be used for enhanced receiver sensitivity, in accordance with at least one embodiment described in the present disclosure. The method 1200 may be arranged in accordance with at least one embodiment described in the present disclosure.

The method 1200 may be performed by processing logic that may include hardware (circuitry, dedicated logic, etc.), software (such as is run on a computer system or a dedicated machine), or a combination of both, which processing logic may be included in the processing device 1454 of FIG. 14 or another device, combination of devices, or systems.

The method 1200 may begin at block 1210 where the processing logic may receive the Rx output signal from the receiver path.

At block 1220, the processing logic may receive the dRx output signal from the dRx path.

At block 1230, the processing logic may calibrate the dRx output signal based on the Rx output signal to generate a dRx non-linear actuation (NA) input signal.

At block 1240, the processing logic may generate a dRx intermodulation distortion signal by using a dRx NA function on the dRx NA input signal.

Modifications, additions, or omissions may be made to the method 1200 without departing from the scope of the present disclosure. For example, in some embodiments, the method 1200 may include any number of other components that may not be explicitly illustrated or described.

FIG. 13 illustrates a process flow of an example method 1300 that may be used for enhanced receiver sensitivity, in accordance with at least one embodiment described in the present disclosure. The method 1300 may be arranged in accordance with at least one embodiment described in the present disclosure.

The method 1300 may be performed by processing logic that may include hardware (circuitry, dedicated logic, etc.), software (such as is run on a computer system or a dedicated machine), or a combination of both, which processing logic may be included in the processing device 1454 of FIG. 14 or another device, combination of devices, or systems.

The method 1300 may begin at block 1310 where the processing logic may compute, on a passive intermodulation cancellation (PIMC) control path, one or more diagnostic receiver (dRx) calibration parameters to match a dRx output signal to a receiver (Rx) output signal, wherein the dRx output signal has an external source.

At block 1320, the processing logic compute, on the PIMC control path, one or more dRx PIMC coefficients for a dRx nonlinear actuation (NA) function.

At block 1330, the processing logic may send, from the PIMC control path to a PIMC data path, the one or more dRx calibration parameters and the one or more dRx PIMC coefficients to generate a dRx intermodulation distortion signal based on the dRx NA function.

Modifications, additions, or omissions may be made to the method 1300 without departing from the scope of the present disclosure. For example, in some embodiments, the method 1300 may include any number of other components that may not be explicitly illustrated or described.

FIG. 14 illustrates a block diagram of an example communication system 1400 configured for enhanced receiver sensitivity, in accordance with at least one embodiment described in the present disclosure. The communication system 1400 may include a digital transmitter 1402, a radio frequency circuit 1404, a device 1414, a digital receiver 1406, and a processing device 1408. The digital transmitter 1406 and the processing device may be configured to receive a baseband signal via connection 1410. A transceiver 1416 may comprise the digital transmitter 1402 and the radio frequency circuit 1404.

In some embodiments, the communication system 1400 may include a system of devices that may be configured to communicate with one another via a wired or wireline connection. For example, a wired connection in the communication system 1400 may include one or more Ethernet cables, one or more fiber-optic cables, and/or other similar wired communication mediums. Alternatively, or additionally, the communication system 1400 may include a system of devices that may be configured to communicate via one or more wireless connections. For example, the communication system 1400 may include one or more devices configured to transmit and/or receive radio waves, microwaves, ultrasonic waves, optical waves, electromagnetic induction, and/or similar wireless communications. Alternatively, or additionally, the communication system 1400 may include combinations of wireless and/or wired connections. In these and other embodiments, the communication system 1400 may include one or more devices that may be configured to obtain a baseband signal, perform one or more operations to the baseband signal to generate a modified baseband signal, and transmit the modified baseband signal, such as to one or more loads.

In some embodiments, the communication system 1400 may include one or more communication channels that may communicatively couple systems and/or devices included in the communication system 1400. For example, the transceiver 1416 may be communicatively coupled to the device 1414.

In some embodiments, the transceiver 1416 may be configured to obtain a baseband signal. For example, as described herein, the transceiver 1416 may be configured to generate a baseband signal and/or receive a baseband signal from another device. In some embodiments, the transceiver 1416 may be configured to transmit the baseband signal. For example, upon obtaining the baseband signal, the transceiver 1416 may be configured to transmit the baseband signal to a separate device, such as the device 1414. Alternatively, or additionally, the transceiver 1416 may be configured to modify, condition, and/or transform the baseband signal in advance of transmitting the baseband signal. For example, the transceiver 1416 may include a quadrature up-converter and/or a digital to analog converter (DAC) that may be configured to modify the baseband signal. Alternatively, or additionally, the transceiver 1416 may include a direct radio frequency (RF) sampling converter that may be configured to modify the baseband signal.

In some embodiments, the digital transmitter 1402 may be configured to obtain a baseband signal via connection 1410. In some embodiments, the digital transmitter 1402 may be configured to up-convert the baseband signal. For example, the digital transmitter 1402 may include a quadrature up-converter to apply to the baseband signal. In some embodiments, the digital transmitter 1402 may include an integrated digital to analog converter (DAC). The DAC may convert the baseband signal to an analog signal, or a continuous time signal. In some embodiments, the DAC architecture may include a direct RF sampling DAC. In some embodiments, the DAC may be a separate element from the digital transmitter 1402.

In some embodiments, the transceiver 1416 may include one or more subcomponents that may be used in preparing the baseband signal and/or transmitting the baseband signal. For example, the transceiver 1416 may include an RF front end (e.g., in a wireless environment) which may include a power amplifier (PA), a digital transmitter (e.g., 1402), a digital front end, an Institute of Electrical and Electronics Engineers (IEEE) 1588v2 device, a Long-Term Evolution (LTE) physical layer (L-PHY), an (S-plane) device, a management plane (M-plane) device, an Ethernet media access control (MAC)/personal communications service (PCS), a resource controller/scheduler, and the like. In some embodiments, a radio (e.g., a radio frequency circuit 1404) of the transceiver 1416 may be synchronized with the resource controller via the S-plane device, which may contribute to high-accuracy timing with respect to a reference clock.

In some embodiments, the transceiver 1416 may be configured to obtain the baseband signal for transmission. For example, the transceiver 1416 may receive the baseband signal from a separate device, such as a signal generator. For example, the baseband signal may come from a transducer configured to convert a variable into an electrical signal, such as an audio signal output of a microphone picking up a speaker's voice. Alternatively, or additionally, the transceiver 1416 may be configured to generate a baseband signal for transmission. In these and other embodiments, the transceiver 1416 may be configured to transmit the baseband signal to another device, such as the device 1414.

In some embodiments, the device 1416 may be configured to receive a transmission from the transceiver 1416. For example, the transceiver 1416 may be configured to transmit a baseband signal to the device 1414.

In some embodiments, the radio frequency circuit 1404 may be configured to transmit the digital signal received from the digital transmitter 1402. In some embodiments, the radio frequency circuit 1404 may be configured to transmit the digital signal to the device 1414 and/or the digital receiver 1406. In some embodiments, the digital receiver 1406 may be configured to receive a digital signal from the RF circuit and/or send a digital signal to the processing device 1408.

In some embodiments, the processing device 1408 may be a standalone device or system, as illustrated. Alternatively, or additionally, the processing device 1408 may be a component of another device and/or system. For example, in some embodiments, the processing device 1408 may be included in the transceiver 1416. In instances in which the processing device 1408 is a standalone device or system, the processing device 1408 may be configured to communicate with additional devices and/or systems remote from the processing device 1408, such as the transceiver 1416 and/or the device 1414. For example, the processing device 1408 may be configured to send and/or receive transmissions from the transceiver 1416 and/or the device 1414. In some embodiments, the processing device 1408 may be combined with other elements of the communication system 1400.

For simplicity of explanation, methods and/or process flows described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

Figure 15:
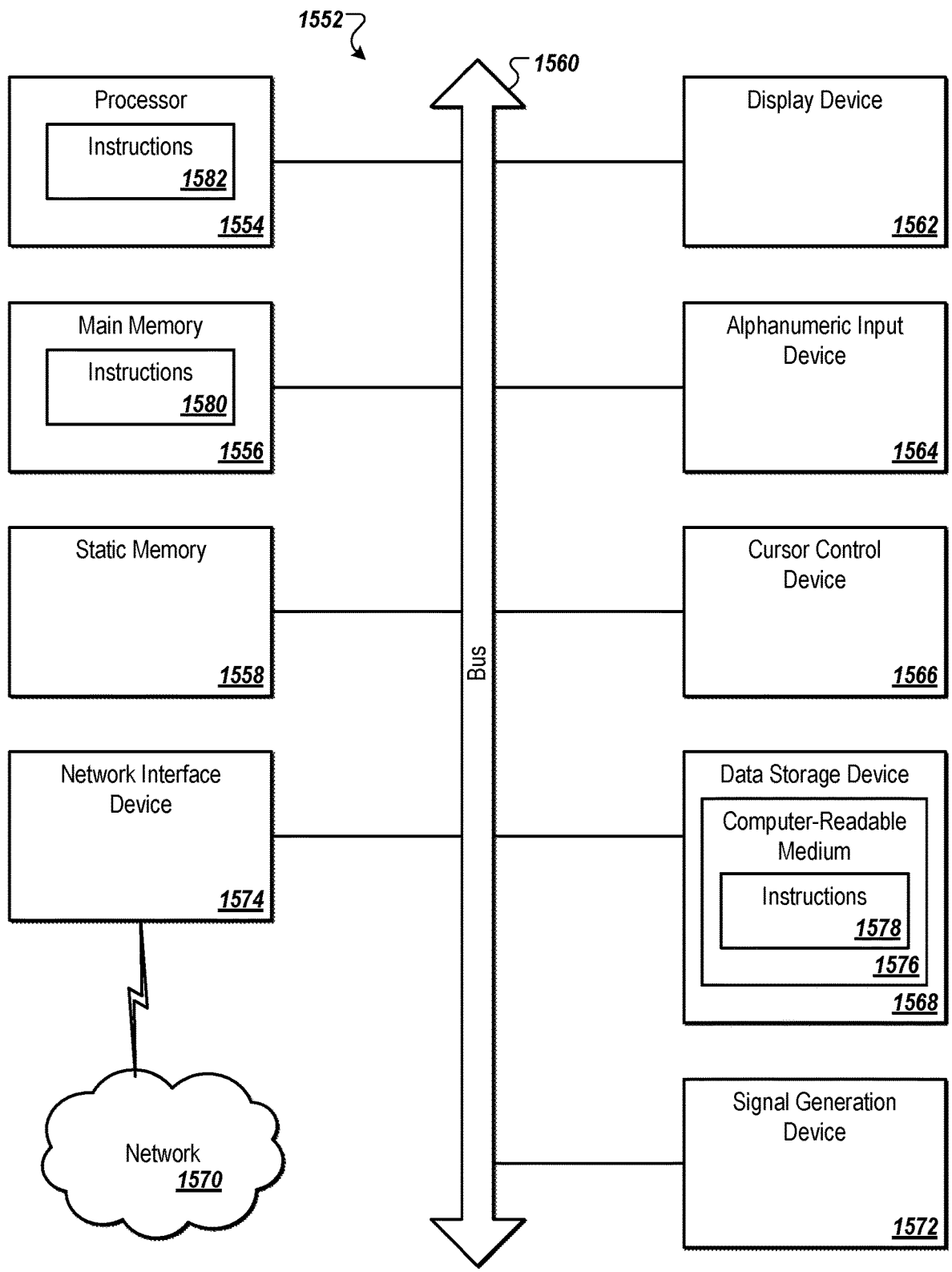
FIG. 15 illustrates a diagrammatic representation of a machine in the example form of a computing device within which a set of instructions, for causing the machine to perform any one or more of the methods discussed herein, may be executed.

FIG. 15 illustrates a diagrammatic representation of a machine in the example form of a computing device 1500 within which a set of instructions, for causing the machine to perform any one or more of the methods discussed herein, may be executed. The computing device 1500 may include a rackmount server, a router computer, a server computer, a mainframe computer, a laptop computer, a tablet computer, a desktop computer, or any computing device with at least one processor, etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. Further, while only a single machine is illustrated, the term "machine" may also include any collection of machines that individually or jointly execute a set (or multiple sets) of instructions to perform any one or more of the methods discussed herein.

The example computing device 1500 includes a processing device (e.g., a processor) 1502, a main memory 1504 (e.g., read-only memory (ROM), flash memory, dynamic random access memory (DRAM) such as synchronous DRAM (SDRAM)), a static memory 1506 (e.g., flash memory, static random access memory (SRAM)) and a data storage device 1516, which communicate with each other via a bus 1508.

Processing device 1502 represents one or more general-purpose processing devices such as a microprocessor, central processing unit, or the like. More particularly, the processing device 1502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1502 may also include one or more special-purpose processing devices such as an application specific integrated circuit (ASIC), a field programmable gate array (FPGA), a digital signal processor (DSP), network processor, or the like. The processing device 1502 is configured to execute instructions 1526 for performing the operations and steps discussed herein.

The computing device 1500 may further include a network interface device 1522 which may communicate with a network 1518. The computing device 1500 also may include a display device 1510 (e.g., a liquid crystal display (LCD) or a cathode ray tube (CRT)), an alphanumeric input device 1512 (e.g., a keyboard), a cursor control device 1514 (e.g., a mouse) and a signal generation device 1520 (e.g., a speaker). In at least one embodiment, the display device 1510, the alphanumeric input device 1512, and the cursor control device 1514 may be combined into a single component or device (e.g., an LCD touch screen).

The data storage device 1516 may include a computer-readable storage medium 1524 on which is stored one or more sets of instructions 1526 embodying any one or more of the methods or functions described herein. The instructions 1526 may also reside, completely or at least partially, within the main memory 1504 and/or within the processing device 1502 during execution thereof by the computing device 1500, the main memory 1504 and the processing device 1502 also constituting computer-readable media. The instructions may further be transmitted or received over a network 1518 via the network interface device 1522.

While the computer-readable storage medium 1524 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

EXAMPLES

The following provide examples of the performance characteristics according to embodiments of the present disclosure.

Example 1: Cancellation of One PIM Source

Figure 16:
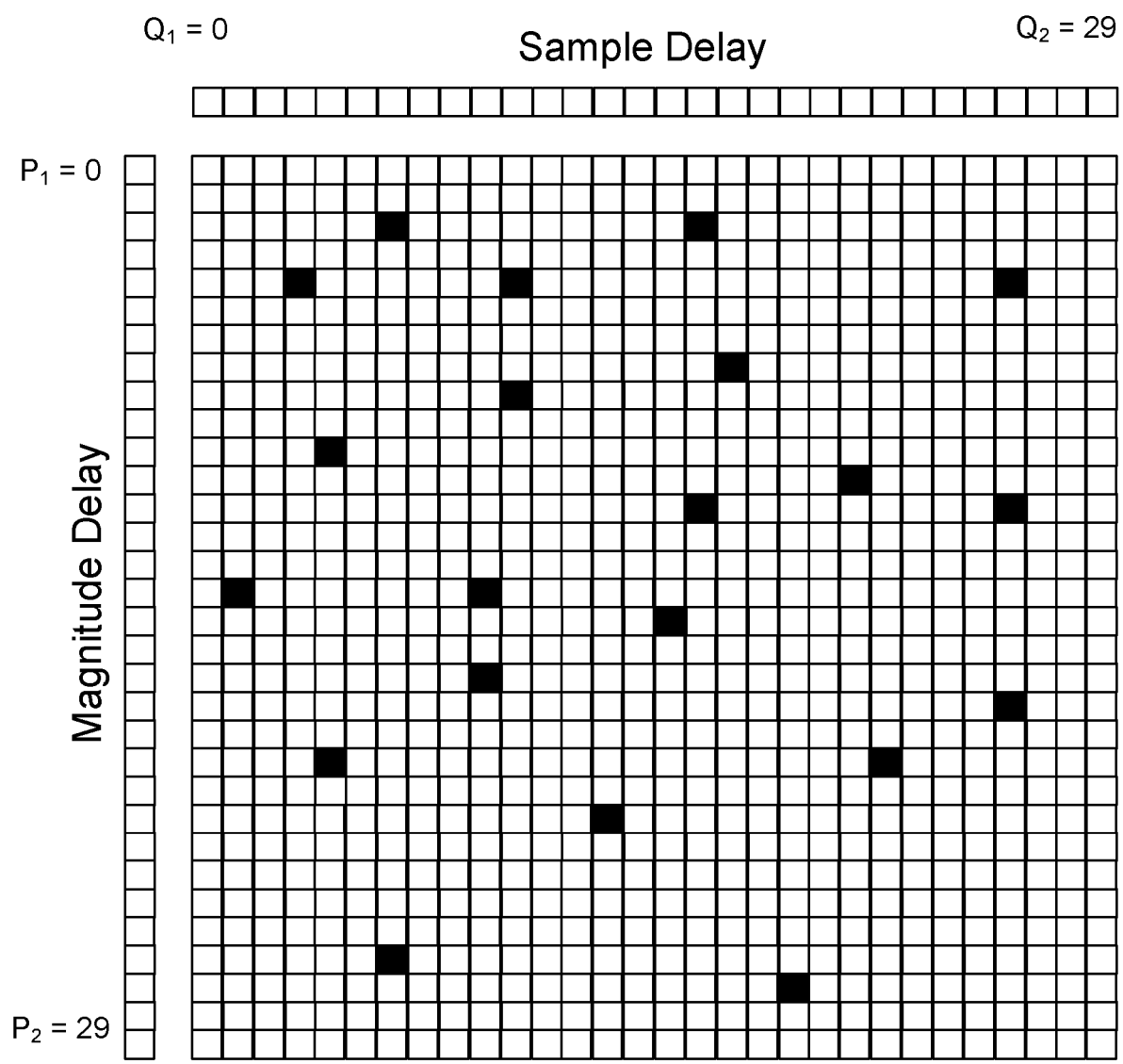
FIG. 16 illustrates an example nonlinear actuation function map to cancel passive intermodulation from one source.

As illustrated in FIG. 16, a non-linear actuation function may be represented as tiles having a sample delay and a magnitude delay. Each black tile may represent a non-linear term of the form, $\varphi_{q,p}(.)$. Each of the black tiles may be a LUT that may be allocated for PIM cancellation. In this example, all available nonlinear actuator terms (e.g., LUTs) are allocated to cancel PIM generated by a single source.

Example 2: Cancellation of Two PIM Sources

Figure 17:
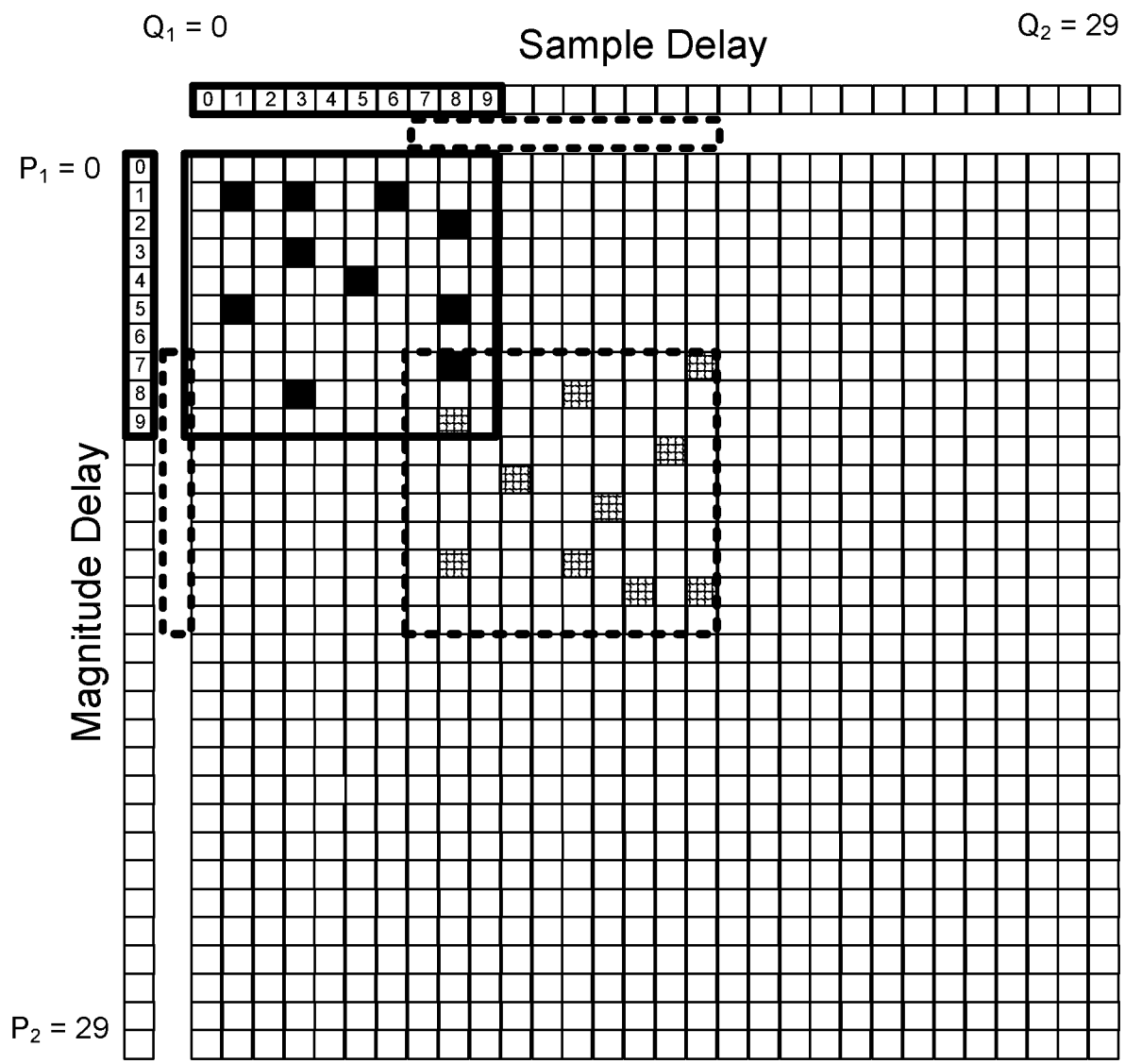
FIG. 17 illustrates an example nonlinear actuation function map to cancel passive intermodulation from two sources.

As illustrated in FIG. 17, the nonlinear actuation function may be described by the map below. Each black tile represents a nonlinear term of the form $\varphi_{q,p}(.)$. In this example, the black tiles (which correspond to LUTs) (which are substantially on the left side, and outer edges of the diagram (e.g., 1-9)) are assigned to a first PIM source while the grid-patterned tiles (which correspond to LUTs) (which are substantially on the ride side, and inside the outer edges of the diagram (e.g., adjacent to 7-16)) are assigned to the second PIM source.

Note that this grouping of tiles can be adjusted with different number of tiles assigned to each PIM source. Also, some tiles may be allocated to more than one PIM source (e.g., 5). Any number of PIM sources may be present and in such scenarios, a corresponding number of groupings may be allocated. Any combination of tiles may be allocated for each PIM source, including overlapping tiles between PIM sources. Further, any number of tiles (e.g., LUTs) may be used. For example, 20 tiles are available for allocation, but any number of tiles may be used.

In some embodiments, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A base station configured for enhanced receiver sensitivity, comprising:
    a receiver (Rx) configured to receive an Rx output signal in an Rx band, wherein the Rx output signal has a first passive intermodulation (PIM) source in the Rx band and a second PIM source in the Rx band; and
    a processing device configured to:
        receive the Rx output signal from the receiver on an Rx path;
        receive a crest factor reduction (CFR) output signal from a CFR on a transmit (Tx) path;
        identify the first PIM source and the second PIM source based on the Rx output signal and the CFR output signal;
        calibrate the CFR output signal based on the first and second PIM sources in the Rx output signal to generate a non-linear actuation (NA) input signal; and
        generate an intermodulation distortion signal by using an NA function on the NA input signal.

2. The base station of claim 1, wherein the processing device is further configured to:
    calibrate the CFR output signal based on one or more time delay coefficients for the first PIM source and one or more time delay coefficients for the second PIM source;
    calibrate the CFR output signal based on one or more gain adjust coefficients;
    and calibrate the CFR output signal based on one or more phase adjust coefficients.

3. The base station of claim 1, wherein the processing device is further configured to:
    adjust one or more delay limits in the NA function based on an identification of the first and second PIM sources in the Rx output signal; and
    identify one or more memory elements storing the one or more delay limits in a memory device to model the first and second PIM sources.

4. The base station of claim 1, wherein the processing device is further configured to:
    identify a first cross-correlation peak and a second cross-correlation peak to identify the first PIM source and the second PIM source.

5. The base station of claim 1, wherein the processing device is further configured to:
    select, in real-time, a number of PIM sources to cancel, wherein the number of PIM sources includes the first and second PIM sources;
    allocate the first PIM source to a first set of nonlinear terms in a nonlinear function in the NA function;
    allocate, the second PIM source to a second set of nonlinear terms in a nonlinear function in the NA function; and
    generate the intermodulation distortion signal to cancel: the first PIM source using the first set of nonlinear terms, and the second PIM source using the second set of nonlinear terms.

6. The base station of claim 1, wherein the processing device is further configured to:
    compute a physical distance between the first PIM source and the second PIM source based on one or more echoes in a PIM signal in the Rx band.

7. A base station configured for enhanced receiver sensitivity, comprising:
    a receiver (Rx) path configured to receive an Rx output signal;
    a diagnostic receiver (dRx) path configured to receive a dRx output signal, wherein the dRx output signal has an external source; and
    a processing device configured to:
        receive the Rx output signal from the receiver path;
        receive the dRx output signal from the dRx path;
        calibrate the dRx output signal based on the Rx output signal to generate a dRx non-linear actuation (NA) input signal; and
        generate a dRx intermodulation distortion signal by using a dRx NA function on the dRx NA input signal.

8. The base station of claim 7, further comprising:
    a transmit (Tx) path configured to transmit a crest factor reduction (CFR) output signal in a Tx band.

9. The base station of claim 8, wherein the processing device is further configured to:
    calibrate the CFR output signal based on the Rx output signal to generate a Tx non-linear actuation (NA) input signal; and
    generate a Tx intermodulation distortion signal by using a Tx NA function on the Tx NA input signal.

10. The base station of claim 7, wherein the processing device is further configured to:
    calibrate the dRx output signal based on one or more time delay coefficients;
    calibrate the dRx output signal based on one or more gain adjust coefficients;
    and calibrate the dRx output signal based on one or more phase adjust coefficients.

11. The base station of claim 7, wherein the processing device is further configured to:
    compute the dRx NA function using a non-linear function including one or more of: a look-up table (LUT), a polynomial, a wavelet function, or a piecewise linear (PWL) function; and
    compute the non-linear function using one or more passive intermodulation cancellation (PIMC) coefficients, wherein the PIMC coefficients are estimated by computing a least squares solution.

12. The base station of claim 7, further comprising:
one or more filters configured to remove signals outside a frequency range for a PIMC signal as computed based on a frequency shift of the dRx intermodulation distortion signal; or
a multi-band filter configured to select an Rx frequency range to remove interleaved uplink and downlink frequency bands in the Rx output signal.

13. The base station of claim 7, further comprising:
an adaptive filter configured to adjust a gain of the dRx intermodulation distortion signal based on an automatic gain control (AGC) error, a low noise amplifier (LNA) error, or a temperature-induced error; or
the adaptive filter configured to adjust a phase of the dRx intermodulation distortion signal based on an automatic gain control (AGC) error, a low noise amplifier (LNA) error, or a temperature-induced error; or
a PIMC subtractor configured to generate a corrected Rx signal based on the dRx intermodulation distortion signal and the Rx output signal.

14. The base station of claim 7, further comprising:
an on-board calibration unit configured to calibrate the dRx output signal based on the Rx output signal using adaptive calculation and adaptive adjustment; or
an on-board coefficient estimation engine configured to compute the NA function using one or more passive intermodulation cancellation (PIMC) coefficients that are calculated and updated based on radio traffic data.

15. A non-transitory computer-readable storage medium including computer executable instructions that, when executed by one or more processors, cause a base station to:
compute, on a passive intermodulation cancellation (PIMC) control path, one or more diagnostic receiver (dRx) calibration parameters to match a dRx output signal to a receiver (Rx) output signal, wherein the dRx output signal has an external source;
compute, on the PIMC control path, one or more dRx PIMC coefficients for a dRx nonlinear actuation (NA) function; and
send, from the PIMC control path to a PIMC data path, the one or more dRx calibration parameters and the one or more dRx PIMC coefficients to generate a dRx intermodulation distortion signal based on the dRx NA function.

16. The computer-readable storage medium of claim 15, wherein the instructions, when executed by the one or more processors, further cause the base station to:
compute, on the PIMC control path, one or more transmit (Tx) calibration parameters to match a CFR output signal to a receiver (Rx) output signal;
compute, on the PIMC control path, one or more Tx PIMC coefficients for a Tx actuation (NA) function; and
send, from the PIMC control path to a PIMC data path, the one or more Tx calibration parameters and the one or more Tx PIMC coefficients to generate a Tx intermodulation distortion signal based on the Tx NA function.

17. The computer-readable storage medium of claim 15, wherein the instructions, when executed by the one or more processors, further cause the base station to:
compute, on the PIMC control path, the one or more dRx calibration parameters that comprise one or more time delay coefficients, based on one or more of a round-trip delay, a cross-correlation, or a mean squared error between the dRx output signal and the Rx output signal; or
compute, on the PIMC control path, the one or more dRx calibration parameters that comprise one or more alignment parameters including one or more of a sample alignment parameter or a sub-sample alignment parameter.

18. The computer-readable storage medium of claim 15, wherein the instructions, when executed by the one or more processors, further cause the base station to:
compute, on the PIMC control path, the one or more dRx calibration parameters that comprise one or more gain adjust coefficients based on one or more of:
a gain-adjustment match between the dRx output signal and a dRx NA function input signal,
a gain-adjustment based on an automatic gain control (AGC) radio frequency (RF) attenuation state for the Rx output signal, or
the gain adjustment based on variation induced by temperature or component age; and
compute, on the PIMC control path, the one or more dRx calibration parameters that comprise one or more phase adjust coefficients based on one or more of:
a phase-adjustment match between the dRx output signal and a dRx NA function input signal,
a phase-adjustment based on an automatic gain control (AGC) radio frequency (RF) attenuation state for the Rx output signal, or
the phase adjustment based on variation induced by temperature or component age.

19. The computer-readable storage medium of claim 15, wherein the instructions, when executed by the one or more processors, further cause the base station to:
compute, on the PIMC control path, the one or more dRx PIMC coefficients by calculating a least squares solution using one or more of:
closed-form using an inverse matrix, or
gradient descent using a fixed step-size parameter, or
conjugate-gradient descent using a dynamic step-size parameter,
wherein the dRx PIMC coefficients are estimated based on one or more parameters including leak factor, number of batches, or batch-size, and
wherein the fixed step-size parameter or the dynamic step-size parameter are configured based on one or more of closed-loop stability, estimated noise suppression, or a time of convergence, or
compute, on the PIMC control path, the one or more dRx PIMC coefficients, wherein a coefficient vector including the dRx PIMC coefficients is iteratively updated after a selected amount of samples.

20. The computer-readable storage medium of claim 15, wherein the instructions, when executed by the one or more processors, further cause the base station to:
compute, on the PIMC control path, one or more sample-magnitude delay pairs for the dRx NA function; or
compute, on the PIMC control path, a sampling rate for the dRx NA function to minimize non-linear components.

21. The computer-readable storage medium of claim 15, wherein the instructions, when executed by the one or more processors, further cause the base station to:
computing, on the PIMC control path, one or more of a start time or a duration for a dRx output sample to calculate a dRx power level;
computing, on the PIMC control path, one or more of a start time or a duration for an Rx output sample to calculate an Rx interference level; and compute, on the PIMC control path, the one or more dRx PIMC coefficients based on one or more of the dRx power level or the Rx interference level.

22. The computer-readable storage medium of claim 15, wherein the instructions, when executed by the one or more processors, further cause the base station to:
compute, on the PIMC control path, a dRx PIMC bypass signal when one or more of:
an antenna is being calibrated,
a power amplifier (PA) protection procedure is being performed, or
dRx PIM is not detected based on one or more of a frequency allocation or an estimated dRx PIM correction level.

23. The computer-readable storage medium of claim 15, wherein the instructions, when executed by the one or more processors, further cause the base station to:
compute, on the PIMC control path, one or more dRx PIMC configuration parameters to generate a dRx PIMC signal, wherein the one or more dRx PIMC configuration parameters include: a frequency shift of the dRx intermodulation distortion signal, a dRx filter configuration parameter, a re-sample ratio between the Rx output signal and the dRx output signal, a resampling timing phase adjustment between the Rx output signal and the dRx output signal; and
send, from the PIMC control path to the PIMC data path, the one or more dRx PIMC configuration parameters to generate the dRx PIMC signal based on the dRx intermodulation distortion signal.

24. The computer-readable storage medium of claim 23, wherein the instructions, when executed by the one or more processors, further cause the base station to:
compute, on the PIMC control path, the frequency shift to match a frequency location of dRx passive intermodulation in the Rx output signal; or
compute, on the PIMC control path, the frequency shift based on a frequency allocation between an Rx band of the Rx output signal and a frequency band for the dRx output signal.

25. The computer-readable storage medium of claim 23, wherein the instructions, when executed by the one or more processors, further cause the base station to:
compute, on the PIMC control path, the dRx filter configuration parameters for one or more filters to remove signals outside a frequency range for the dRx PIMC signal; or
compute, on the PIMC control path, the dRx filter configuration parameters for the one or more filters to remove interleaved uplink and downlink frequency bands in an Rx frequency range.

\* \* \* \* \*